United States Patent
Akkarakaran et al.

(10) Patent No.: US 11,909,582 B2
(45) Date of Patent: Feb. 20, 2024

(54) NETWORK NOTIFICATION OF A CELL TIMING SOURCE OUTAGE

(71) Applicant: QUALCOMM Incorporated, San Diego, CA (US)

(72) Inventors: Sony Akkarakaran, Poway, CA (US); Tao Luo, San Diego, CA (US); Jingchao Bao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/402,275

(22) Filed: Aug. 13, 2021

(65) Prior Publication Data
US 2023/0050110 A1 Feb. 16, 2023

(51) Int. Cl.
*H04L 41/0686* (2022.01)
*H04J 3/06* (2006.01)
(Continued)

(52) U.S. Cl.
CPC ............ *H04L 41/0686* (2013.01); *H04J 3/06* (2013.01); *H04J 3/065* (2013.01); *H04L 43/0864* (2013.01); *H04W 56/004* (2013.01); *H04W 56/0015* (2013.01); *H04W 56/0055* (2013.01); *H04W 56/0065* (2013.01)

(58) Field of Classification Search
CPC .. H04L 41/0686; H04J 3/065; H04W 56/0055
See application file for complete search history.

(56) References Cited

U.S. PATENT DOCUMENTS

| 2010/0172453 A1* | 7/2010 | Cankaya | H04W 56/0015 370/328 |
| 2010/0305767 A1* | 12/2010 | Bengtson | F03D 7/047 709/248 |

(Continued)

FOREIGN PATENT DOCUMENTS

| CA | 2972922 A1 * | 10/2015 | ............ H03M 13/13 |
| JP | 5166163 B2 * | 3/2013 | |

(Continued)

OTHER PUBLICATIONS

ETSI MCC: "Report of 3GPP TSG RAN WG2 Meeting #113bis-e, Online", 3GPP TSG-RAN WG2 meeting #114-e, Draft_R2-113bis-E_Meeting_Report_V3, 3rd Generation Partnership Project (3GPP), Mobile Competence Centre, 650 Route Des Lucioles, F-06921 Sophia-Antipolis Cedex, France, No. Online, Apr. 12, 2021-Apr. 20, 2021, May 10, 2021, 279 Pages, XP052003691, pp. 136-148.

(Continued)

*Primary Examiner* — Samina F Choudhry
(74) *Attorney, Agent, or Firm* — SUNSTEIN LLP/Qualcomm

(57) ABSTRACT

Techniques are provided for informing a network of a timing source outage in a node and reestablishing a synchronized time in the node. An example method for providing a timing source outage notification includes detecting an outage of a timing source, determining one or more impacted nodes, generating one or more notification messages based at least in part on a communication context for each of the one or more impacted nodes, and transmitting the one or more notification messages.

15 Claims, 15 Drawing Sheets

(51) Int. Cl.
H04L 43/0864 (2022.01)
H04W 56/00 (2009.01)

(56) References Cited

U.S. PATENT DOCUMENTS

| | | | |
|---|---|---|---|
| 2014/0301259 A1* | 10/2014 | Homchaudhuri | ... H04W 52/029 370/311 |
| 2018/0167900 A1 | 6/2018 | Wang et al. | |
| 2018/0284149 A1* | 10/2018 | Kommi | ................. G01S 5/0263 |
| 2019/0042525 A1* | 2/2019 | McElrath | ............ G06F 13/4291 |
| 2021/0243720 A1* | 8/2021 | Farag | ................. H04W 56/009 |
| 2022/0236404 A1* | 7/2022 | Gunnarsson | .......... H04W 64/00 |

FOREIGN PATENT DOCUMENTS

| | | | | |
|---|---|---|---|---|
| WO | WO-03088590 A1 * | 10/2003 | ............ | H03M 13/43 |
| WO | 2020167773 A1 | 8/2020 | | |

OTHER PUBLICATIONS

International Search Report and Written Opinion—PCT/US2022/032067—ISA/EPO—dated Sep. 8, 2022.
Kalbkhani H., et al., "Relay Selection for Multi-Source Network-Coded D2D Multicast Communications in Heterogeneous Networks", Wireless Networks, ACM, 2 Penn Plaza, Suite 701—New York USA, vol. 26, No. 8, Jul. 15, 2020 (Jul. 15, 2020), 18 Pages, XP037259749 [retrieved on Jul. 15, 2020] p. 6066-p. 6070.

* cited by examiner

NETWORK NOTIFICATION OF A CELL TIMING SOURCE OUTAGE

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), and a fifth generation (5G) service (e.g., 5G New Radio (NR)). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A wireless communication system may include a number of cells that may operate synchronously or asynchronously. For synchronous operation, the timing of each cell may closely track the timing of neighbor cells. Synchronous operation may be achieved by having each cell align its timing to a reference time source, which may be a global navigation satellite system (GNSS). For asynchronous operation, the timing of each cell may not track and may even be pseudo-random with respect to the timing of neighbor cells. Some features of a wireless communication, such as carrier aggregation (CA) and certain positioning operations depend on synchronization. Local or global GNSS outages may impact the ability of cells to synchronize. A cell may desire to operate synchronously but may temporarily be unable to align its timing to the reference time source due to the GNSS outage. It may be desirable to effectively handle such temporary loss of synchronization due to a GNSS outage in order to mitigate performance degradation.

SUMMARY

An example method for providing a timing source outage notification according to the disclosure includes detecting an outage of a timing source, determining one or more impacted nodes, generating one or more notification messages based at least in part on a communication context for each of the one or more impacted nodes, and transmitting the one or more notification messages.

Implementations of such a method may include one or more of the following features. The outage of the timing source may be associated with a base station. Detecting the outage in the timing source may include receiving a timing source outage notification message from the base station based on a New Radio Positioning Protocol. Detecting the outage of the timing source may be based on a failure to decode a global navigation satellite system signal. Detecting the outage of the timing source may be based on a reference signal measurement obtained by a user equipment. The one or more notification messages may include an indication of a node experiencing the outage of the timing source and a timestamp indicating a time the outage of the timing source occurred. The one or more notification messages may include at least one of an accuracy measure information element, an outage reason information element, a timing sources impacted information element, and a recovery time information element. The communication context for a first impacted node may include a positioning procedure, and transmitting the one or more notification messages includes transmitting a first notification message to the first impacted node via a medium access control control element or a downlink control element. Transmitting the one or more notification messages may include transmitting at least one notification message to a user equipment.

An example method for reestablishing timing synchronization according to the disclosure includes determining a first propagation delay value between a first wireless node and a second wireless node, determining a second propagation delay value between the second wireless node and a third wireless node, wherein the third wireless node is receiving a synchronization reference signal, and determining a network synchronization time based at least in part on the first propagation delay value, the second propagation delay value, and the synchronization reference signal received by the third wireless node.

Implementations of such a method may include one or more of the following features. The first wireless node may be a first base station and the second wireless node may be a first user equipment. Obtaining round trip time measurements based on signals exchanged between the first base station and the first user equipment, such that the first propagation delay value is based on a distance computed using the round trip time measurements. The third wireless node may be a second base station. Obtaining round trip time measurements based on signals exchanged between the second base station and the first user equipment, such that the second propagation delay value is based on a distance computed using the round trip time measurements. The third wireless node may be a second user equipment. Obtaining round trip time measurements based on sidelink signals exchanged between the first user equipment and the second user equipment, wherein the second propagation delay value is based on a distance computed using the round trip time measurements. The synchronization reference signal may be based at least in part on a global navigation satellite system signal. The first wireless node may be a first user equipment and the second wireless node may be a second user equipment. Obtaining round trip time measurements based on sidelink signals exchanged between the first user equipment and the second user equipment, such that the first propagation delay value is based on a distance computed using the round trip time measurements.

An example apparatus according to the disclosure includes a memory, at least one transceiver, at least one processor communicatively coupled to the memory and the at least one transceiver, and configured to detect an outage of a timing source, determine one or more impacted nodes, generate one or more notification messages based at least in part on a communication context for each of the one or more impacted nodes, and transmit the one or more notification messages.

An example apparatus according to the disclosure includes a memory, at least one transceiver, at least one processor communicatively coupled to the memory and the at least one transceiver, and configured to determine a first propagation delay value between a first wireless node and a second wireless node, determine a second propagation delay value between the second wireless node and a third wireless node, wherein the third wireless node is receiving a synchronization reference signal, and determine a network synchronization time based at least in part on the first propagation delay value, the second propagation delay value, and the synchronization reference signal received by the third wireless node.

Items and/or techniques described herein may provide one or more of the following capabilities, as well as other capabilities not mentioned. Satellite navigation systems may be used to synchronize the timing of network nodes, however, satellite signals are susceptible to jamming and other effects which may impact reception of the signals and the timing synchronization of the nodes. A node may experience a timing source outage when satellite signals are not received and/or decoded. A node may detect the loss of a timing source and notify the network. The node may also provide a timing drift value. Network nodes may relay the timing source outage information to other network nodes. Timing source outage notification messages may be based on a communication context of an impacted node. The network nodes may be configured to react to the timing source outage information. The network may be configured to reestablish a synchronized time on an affected node. The timing source outage notification messages enable a network to respond to timing source outages. Other capabilities may be provided and not every implementation according to the disclosure must provide any, let alone all, of the capabilities discussed.

DETAILED DESCRIPTION

Techniques are discussed herein for informing a network of a timing source outage in a node and reestablishing a synchronized time in the node. In general, different communication networks and various features within the communication networks may require synchronization among the network nodes. For example, LTE may utilize synchronous and asynchronous nodes. 5G-NR networks may utilize system frame number (SFN) synchronization in Time Division Duplex (TDD) deployments. Some terrestrial navigation techniques such as Time of Arrival (ToA) and Time Difference of Arrival (TDoA) require that a positioning computation node (e.g., network entity) be aware of synchronization offsets between the nodes transmitting positioning reference signals. Thus, each node must be capable of receiving signals from a timing source to maintain the timing synchronization. Some nodes may utilize the timing signals associated with Global Navigation Satellite Systems (GNSS) to maintain a synchronized time.

GNSS systems are subject to outages for many reasons. For example, local outages may occur due to the presence of a local jammer or a failure/degradation in the receive chain of a GNSS receiver. Global outages, such as with large scale jamming, solar activity, or satellite malfunctions may also cause a station to lose GNSS timing information.

The techniques provided herein enable network notification in response to timing source outages. For example, a network node such as a base station may be configured to detect a timing outage based on GNSS signal decode failures. Other network nodes, such as mobile devices, may be configured to detect a timing outage based on reference signals transmitted from other nodes that are suffering the timing source outage. Timing source outage messages may be carried as part of a protocol between two or more nodes. The timing source outage messages may be relayed via multiple nodes. The timing source outage messages may include details about the timing outage event. Nodes may react to the timing source outage notification. For example, affected nodes may be turned off or otherwise removed from some network procedures. In an embodiment, timing information available to one node in a network may be used to reestablish the timing in another node. For example, a base station may utilize the timing information available at a user equipment or a neighboring base station to reestablish synchronization. Device-to-device (D2D) sidelink synchronization procedures may be used to reestablish timing information. These techniques and configurations are examples, and other techniques and configurations may be used.

Figure 1:
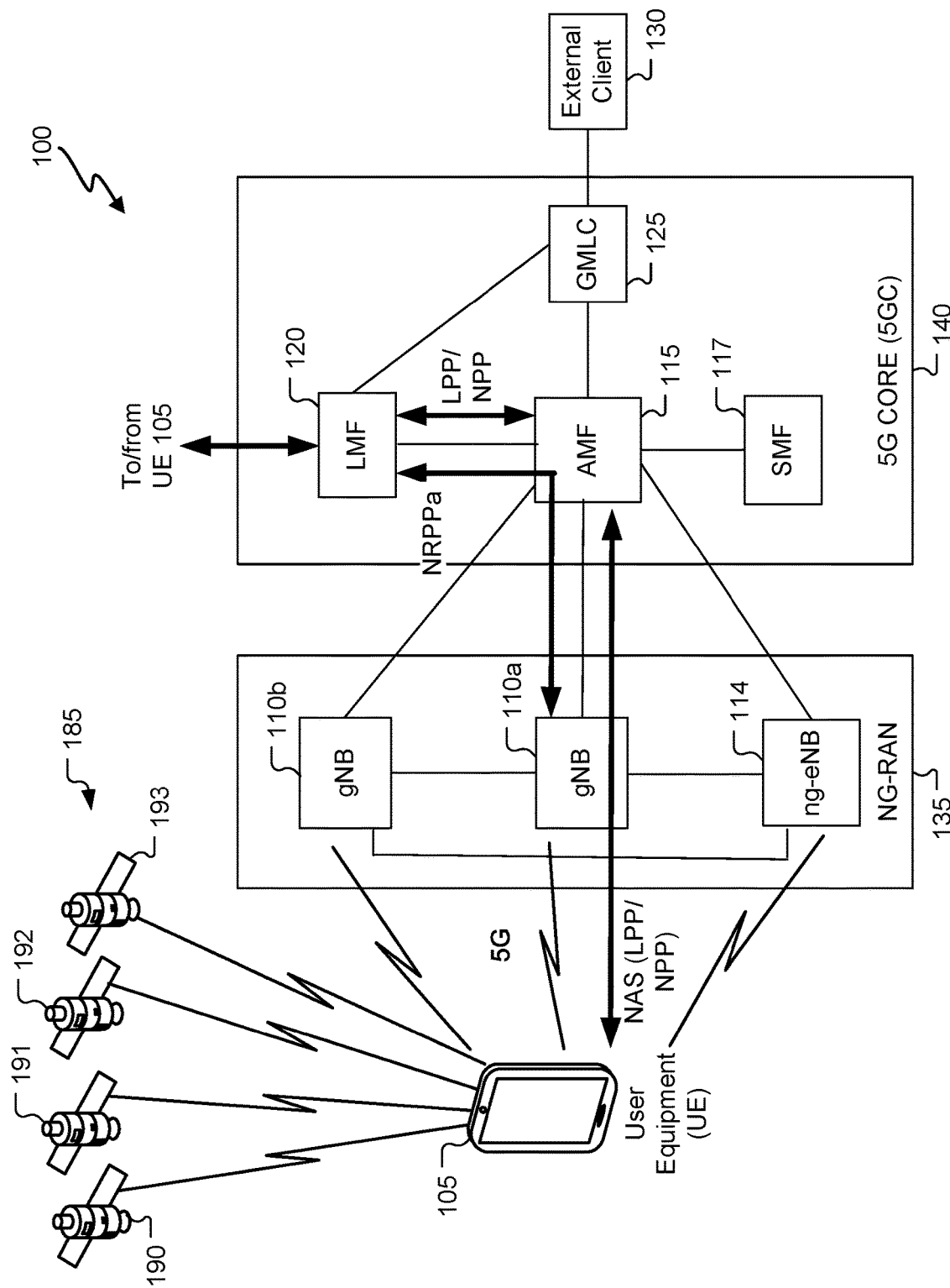
FIG. 1 is a simplified diagram of an example wireless communications system.

Referring to FIG. 1, an example of a communication system 100 includes a UE 105, a Radio Access Network (RAN) 135, here a Fifth Generation (5G) Next Generation (NG) RAN (NG-RAN), and a 5G Core Network (5GC) 140. The UE 105 may be, e.g., an IoT device, a location tracker device, a cellular telephone, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the $3^{rd}$ Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components. In an embodiment, the SVs 190, 191, 192, 193 may provide synchronized timing information to the nodes in the communication network 100. For example, the time references in a GNSS system may include GPS time (GPST), GLONASS time (GLONASST), Galileo System Time (GST), BeiDou Time (BDT), or other synchronized timing signals. In an embodiment, the nodes in the communication network 100 may utilize the GNSS timing information as a timing source to maintain synchronization between the nodes. Local or global outages in the GNSS signal may cause timing source outages for some nodes in the network and impact synchronous sensitive procedures (e.g., inter-cell interference coordination, handover, mobility, time-of-flight based positioning, etc.).

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The BSs 110*a*, 110*b*, 114 may each comprise one or more TRPs. For example, each sector within a cell of a BS may comprise a TRP, although multiple TRPs may share one or more components (e.g., share a processor but have separate antennas). The system 100 may include macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications. The LMF 120 may support positioning of the UE 105 when the UE 105 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120).

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though one of these connections may be supported by the 5GC 140 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time Of Arrival (TOA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
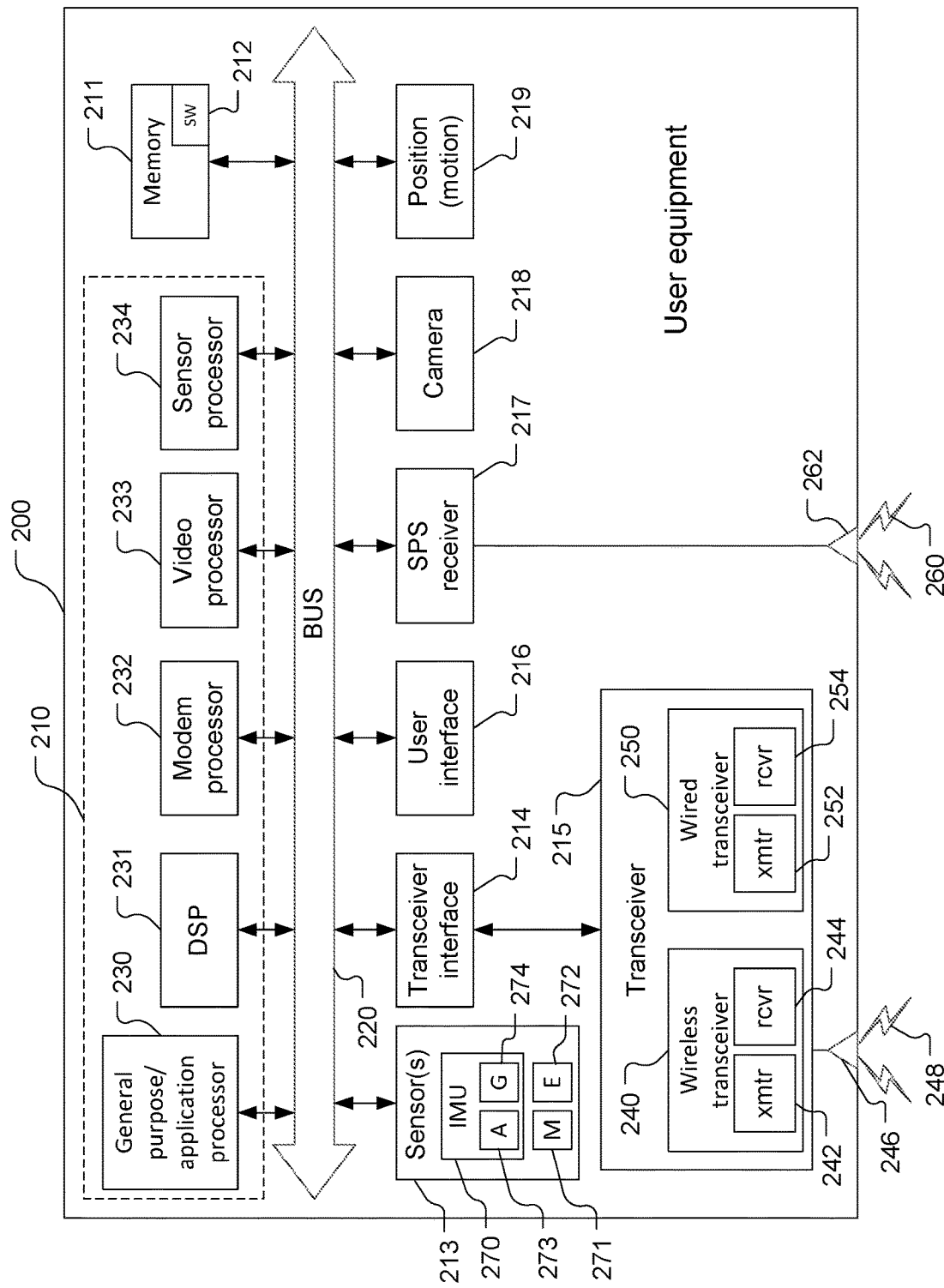
FIG. 2 is a block diagram of components of an example user equipment shown in FIG. 1.

Referring also to FIG. 2, a UE 200 is an example of the UE 105 and comprises a computing platform including a processor 210, memory 211 including software (SW) 212, one or more sensors 213, a transceiver interface 214 for a transceiver 215 (that includes a wireless transceiver 240 and/or a wired transceiver 250), a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatus (e.g., the camera 218, the position (motion) device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PMD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be unconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/ measured by the sensor(s) 213, the UE 200 may notify/ report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/ IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer (s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), V2C (Uu), IEEE 802.11 (including IEEE 802.11p), WiFi, WiFi Direct (WiFi-D), Bluetooth®, Zigbee etc. NR systems may be configured to operate on different frequency layers such as FR1 (e.g., 410-7125 MHz) and FR2 (e.g., 24.25-52.6 GHz), and may extend into new bands such as sub-6 GHz and/or 100 GHz and higher (e.g., FR2x, FR3, FR4). The wired transceiver 250 may include a transmitter 252 and a receiver 254 configured for wired communication, e.g., with the network 135 to send communications to, and receive communications from, the gNB 110a, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless SPS signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion.

Figure 3:
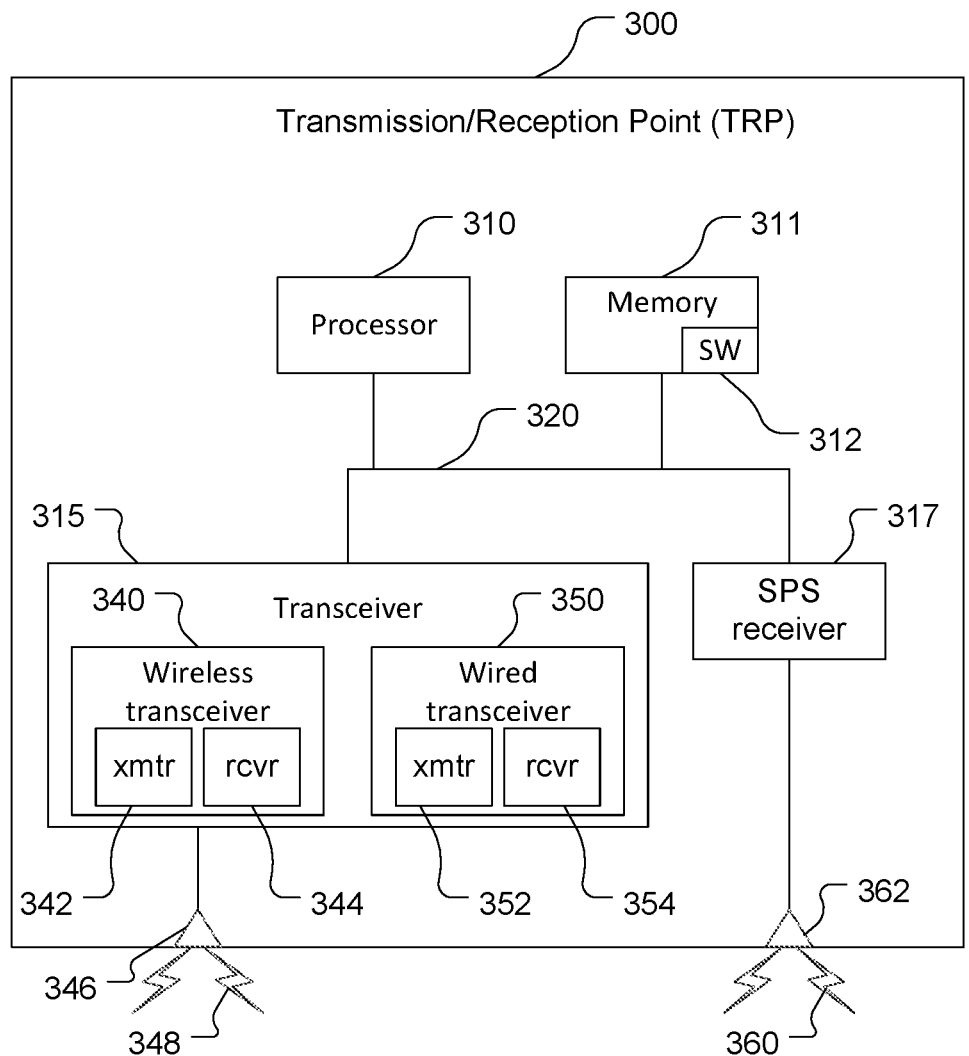
FIG. 3 is a block diagram of components of an example transmission/reception point shown in FIG. 1.

Referring also to FIG. 3, an example of a TRP 300 of the BSs 110a, 110b, 114 comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless interface and/or the SPS receiver 317) may be omitted from the TRP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the BSs 110a, 110b, 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink, downlink, and/or sidelink channels) and/or receiving (e.g., on one or more downlink, uplink and/or sidelink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a transmitter 352 and a receiver 354 configured for wired communication, e.g., with the network 140 to send communications to, and receive communications from, the LMF 120 or other network server, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
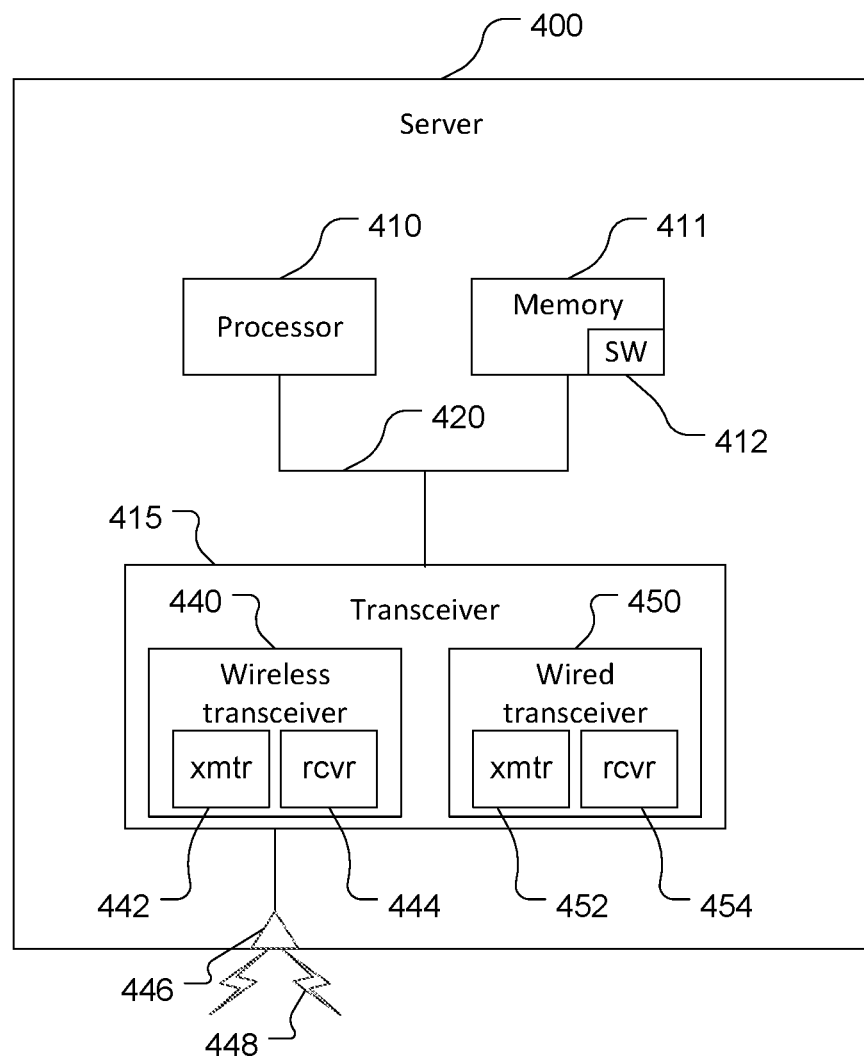
FIG. 4 is a block diagram of components of an example server shown in FIG. 1.

Referring also to FIG. 4, an example server, such as the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 (or the LMF 120) performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/ integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a transmitter 452 and a receiver 454 configured for wired communication, e.g., with the network 135 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Figure 5:
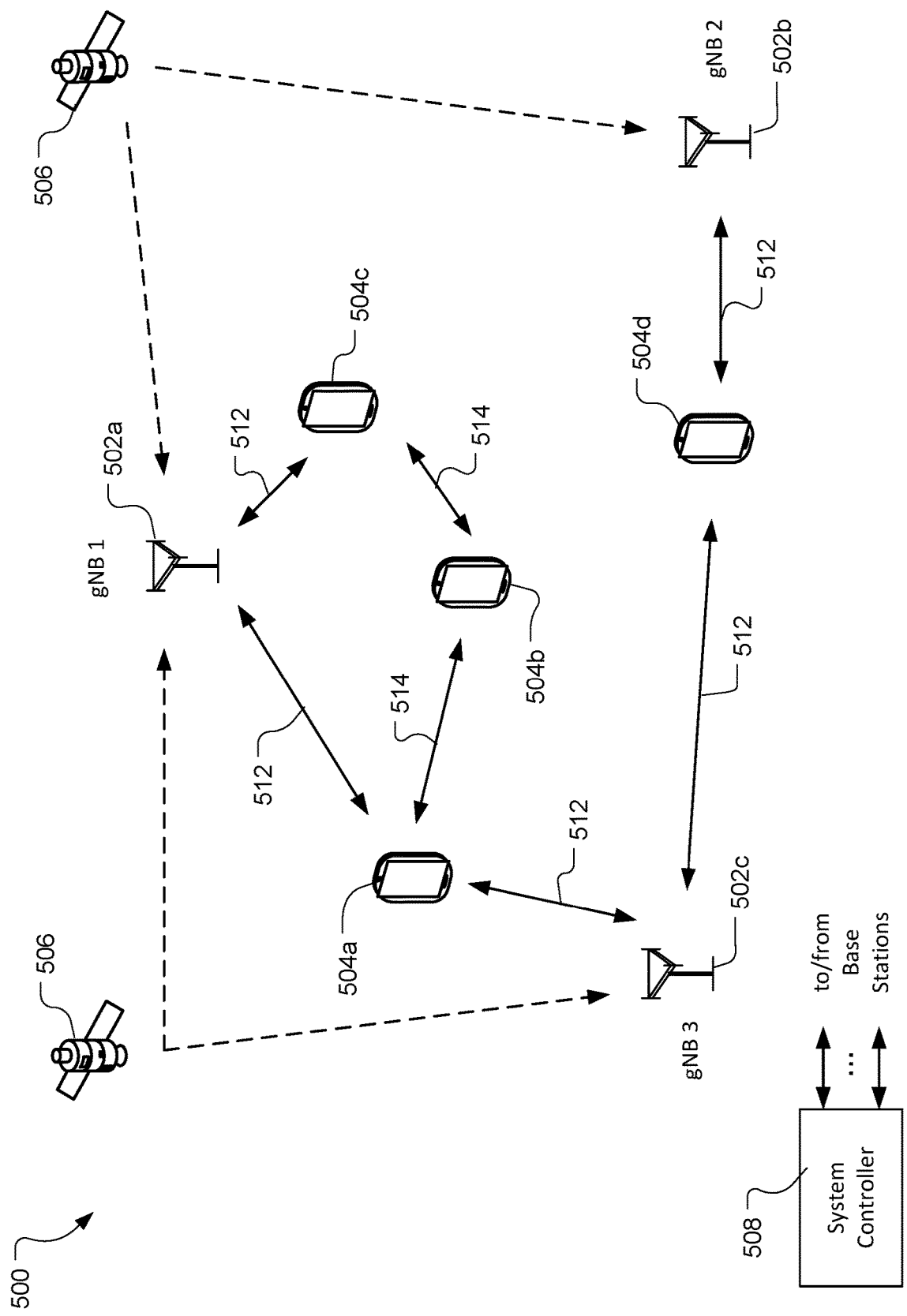
FIG. 5 is a diagram of an example wireless network with a plurality of nodes.

Referring to FIG. 5, an example wireless network 500 with a plurality of nodes is shown. The plurality of nodes may include base stations, such as a first base station 502a, a second base station 502b, and a third base station 502c. Each of the base stations 502a-c may include some or all of the components of the TRP 300, and the TRP 300 may be an example of a base station. In an example, the base stations 502a-c may be included in the NG-RAN 135 such as the gNBs 110a-b and the ng-eNB 114. Each of the base stations 502a-c may provide communication coverage for a particular geographic area. To improve system capacity, the overall coverage area of a base station may be partitioned into multiple (e.g., three) smaller areas. Each smaller area may be served by a respective base station subsystem. The network 500 also includes a plurality of mobile nodes such as a first UE 504a, a second UE 504b, a third UE 504c, and a fourth UE 504d. Each of the UEs 504a-d may include some or all of the components of the UE 200, and the UE 200 may be an example of a UE in the network 500. Other nodes, such as roadside units (RSUs) and Access Points (APs) may also be included in the network 500. The UEs 504a-d may be configured to communicate with the base stations 502a-c via the forward and reverse links 512. The forward link (or downlink) refers to the communication link from a base station to a UE, and the reverse link (or uplink) refers to the communication link from a UE to a base station. The UEs 504a-d may also be configured to communicate with one another via a D2D sidelink protocol 514. For example, in a 5G network, the sidelink protocols 514 may include one or more channels such as a Physical Sidelink Shared Channel (PSSCH), a Physical Sidelink Control Channel (PSCCH), a Physical Sidelink Broadcast Channel (PSBCH), a Sidelink Shared Channel (SL-SCH), and/or other sidelink broadcast channels and synchronization signals.

A system controller 508 may couple to the set of base stations 502a-c and provide coordination and control for the base stations. System controller 508 may be a single network entity or a collection of network entities. For example, the system controller may include one or more nodes in the 5GC 140 such as the AMF 115 and the LMF 120. The system controller 508 may be an Integrated Access and Backhaul (IAB) node, such as a Central Unit (CU) or Donor Unit (DU).

The nodes in the network 500, including the base stations 502a-d, the UEs 504a-c and the system controller 508, may be configured to receive signals from one or more satellites 506, which may be part of the United States Global Positioning System (GPS), the European Galileo system, the Russian GLONASS system, or some other GNSS. The network nodes may obtain accurate timing information from the satellites and may adjust its timing based on this accurate timing information. All cells in the base station typically have the timing of the base station. The network 500 may support synchronous operation, or asynchronous operation, or either synchronous or asynchronous operation. Synchronous operation may also be referred to as a globally synchronous (GS) mode, and asynchronous operation may also be referred to as a globally asynchronous (GA) mode. The GS mode may assume accurate synchronization of the nodes with respect to a reference time source, e.g., GPS or some other GNSS.

Figure 6:
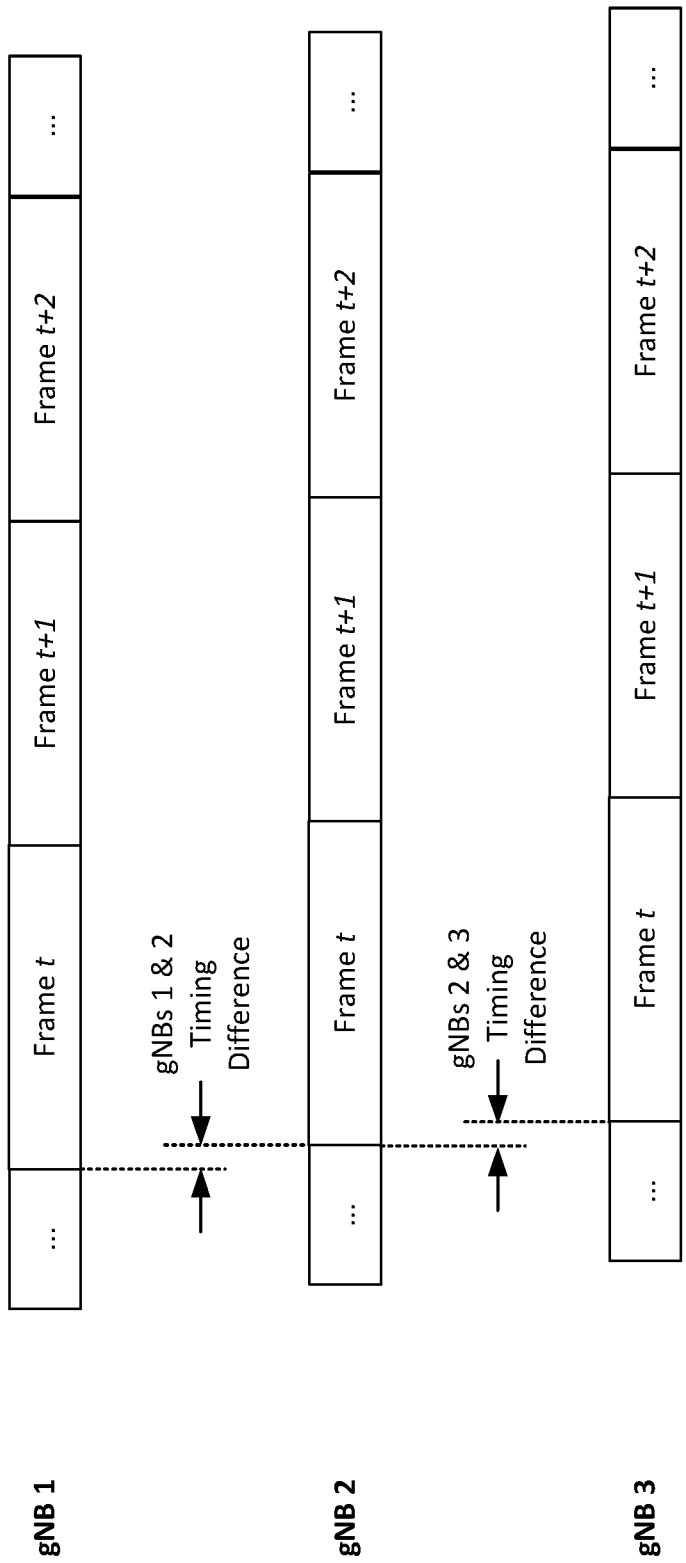
FIG. 6 is an example timing diagram of synchronous operation by three nodes.

Referring to FIG. 6, a synchronous operation by three nodes is shown. The three nodes include a first base station gNB1, a second base station gNB2, and a third base station gNB3. The transmission timeline may be partitioned into units of radio frames. Each radio frame may span a particular time duration, e.g., 10 milliseconds (ms), and may be assigned a frame number. The frame number may be reset to 0 at a specific time, incremented by one for each radio frame thereafter, and wrap around to zero after reaching a maximum value. For synchronous operation, the timing of each node may closely match the timing of neighbor nodes, and the timing difference between adjacent nodes may be required to meet certain requirements. For example, the timing of a cell may be typically less than 3 microseconds (μsecs) and no greater than 10 μsecs from the timing of the neighbor cells.

Synchronous operation may have certain advantages over asynchronous operation. For example, synchronous operation may improve system capacity due to synchronized interference across nodes, synchronized control channels across nodes, faster handoff due to node switching based on re-pointing instead of random access, etc. Synchronous operation may also reduce the complexity of node searches since the timing of undetected nodes may be inferred from the timing of detected nodes. A UE may thus perform node searches over a smaller window around the known timing of a detected node instead of over all possible timing hypotheses.

However, synchronous operation may be associated with additional costs in order to maintain accurate time synchronization. Stringent synchronization accuracy requirements (e.g., better than 3 μsecs typically and no worse than 10 μsecs most of the time) may be achieved with a GNSS receiver as well as a very accurate oscillator at a base station. The GNSS receiver may be used to obtain accurate timing information from satellites, which may be used to update the timing of the nodes (e.g., cells) in the base station. The very accurate oscillator may be used to maintain precise timing for the base station in case of a temporary loss of satellite signals due to a GNSS outage. For example, the base station may be required to maintain synchronization accuracy (e.g., of 10 μsecs or better) without any satellite signals for a specified holdover duration (e.g., of eight hours). These stringent holdover requirements may be met with the very accurate oscillator. This oscillator may have a very small frequency error and can then provide accurate timing within the required synchronization accuracy for the entire holdover duration.

In an embodiment, a network may be configured to react to a GNSS outage to reduce the dependency on the GNSS timing information and the accuracy of the oscillators in the nodes. For example, messaging protocols may be used to inform network nodes of a GNSS outage and the network may be configured to react to reduce the impact of a GNSS outage. In an example, reference signals and D2D sidelink procedures may be used to reestablish the timing in a node experiencing a GNSS timing source outage.

Figure 7:
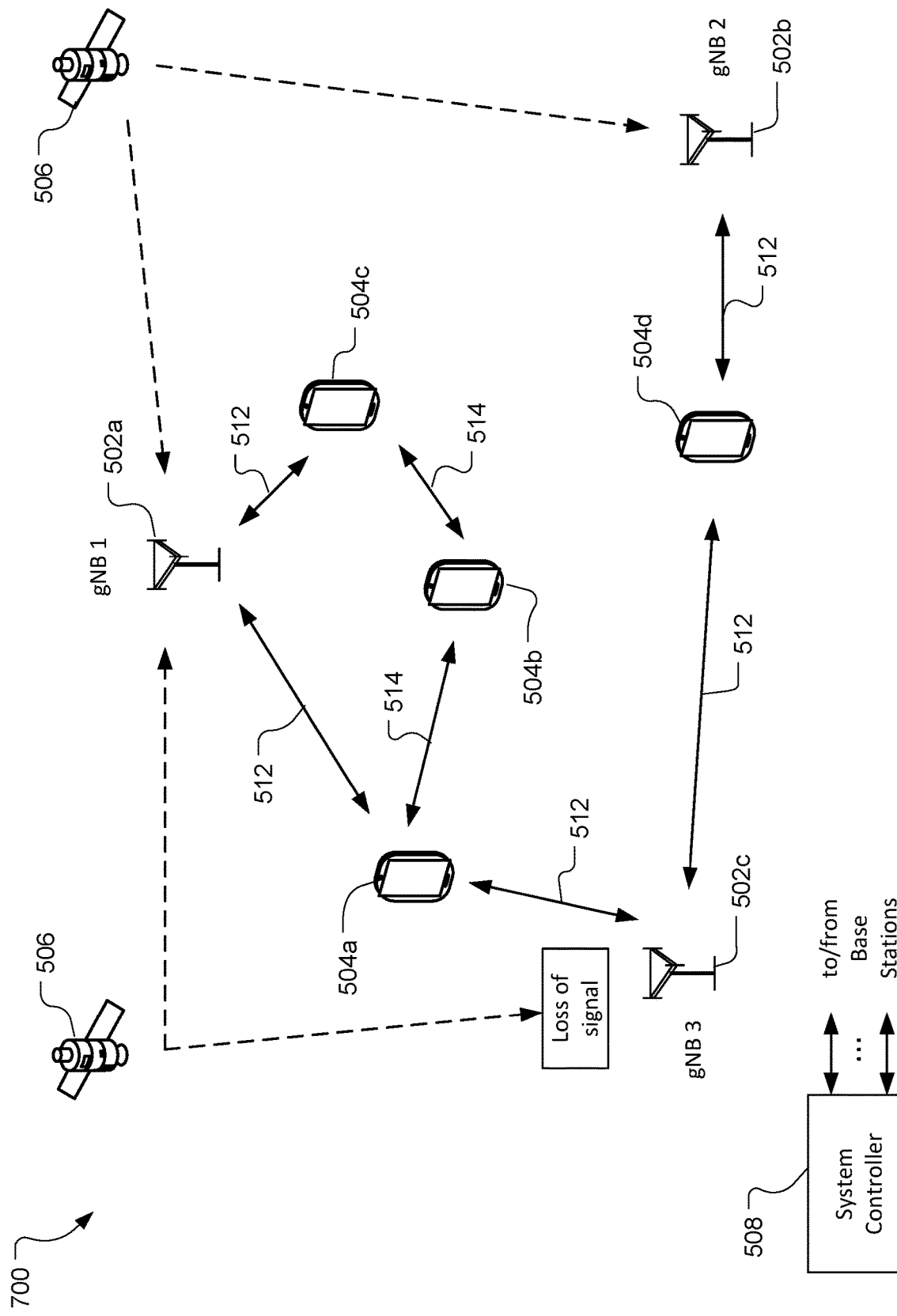
FIG. 7 is a diagram of an example network experiencing a timing source outage on a node.

Referring to FIG. 7, an example network 700 experiencing a timing source outage on a node is shown. The network 700 is an example and includes the nodes described in the network 500 depicted in FIG. 5. In this example, the third base station 502c is experiencing a timing source outage due to a lack of signal from the satellite 506. The loss of signal may be based on transmission issues associated with the satellite 506, environmental and/or atmospheric issues (e.g., solar flares), and/or issues associated with the SPS receiver 317 in the third base station 502c. The timing source outage impacting the third base station 502c may be detected by the third base station 502c (i.e., self-reporting), or by other nodes in the network. For example, a UE or base station with access to a timing source may detect an unacceptable timing difference based on reference signals exchanged with the third base station 502c.

The network nodes may be configured to inform other nodes in the network of the timing source outage being experienced by the third base station 502c. In an embodiment, one or more timing source outage messages may include information about the timing source outage and carried as part of a protocol between two nodes. For example, a NRPPa protocol may be used by one of the base stations 502a-c to report the timing source outage to the system controller 508 (e.g., the LMF 120). Radio Resource Control (RRC) protocol may be used to provide timing source outage information between a base station and a UE. IAB protocols such as Xn and F1 may be used to provide the timing source outage information between DUs and CUs. Other protocols may also be used to provide the timing source outage information to external applications (e.g., external clients 130). If multiple protocols are available between the nodes, then the timing source outage information may be carried by one or more of the multiple protocols. For example, in addition to RRC messages, the gNB and a UE may provide timing source outage information via Medium Access Control (MAC) Control Elements (CE), and Downlink Control Information (DCI) signaling. The timing source outage information may be included in System Information Blocks (SIBs), other paging messages, or other dedicated over-the-air (OTA) messages and/or broadcasts. D2D sidelink protocols may also be used to carry the timing source outage information between nodes. In an embodiment, a node may be configured to select one or more protocols to notify other nodes of the timing source outage. Protocol selection rules may be based on the communication context and/or the nature of the timing source outage. For example, DCI or MAC-CE may be permitted for certain types of GNSS quality reports (e.g., an extreme timing outage) or certain UE configurations (e.g., UE is in a high-priority positioning session which will be directly affected by the outage). Other rules may also be implemented to select a protocol for notifying the network of a timing source outage.

In operation, referring to FIG. 7, the third base station 502c may become aware of the timing source outage based on an inability to decode a GNSS signal. The third base station 502c may provide a first timing source outage message to the system controller 508 via the NRPPa protocol. The system controller 508 may then notify other network nodes (e.g., the first and second base stations 502a-b and/or the UEs 504a-d) of the timing source outage via the NRPPa and/or LPP/NPP protocols. The third base station 502c may also be configured to provide a second timing source outage message to the first UE 504a via on OTA protocol such as RRC, MAC-CE or DCI. The contents of the first and second timing source outage messages may be different. For example, a MAC-CE message may include an indication of the outage and a time stamp. The NRPPa message may include additional information such as an accuracy measure, an outage reason, and expected recovery time. In an embodiment, the first UE 504a may be configured to relay the timing source outage message to other nodes, such as the first base station 502a and/or the second UE 504b. For example, the first UE 504a may provide the timing outage information associated with the third base station 502c to the first base station 502a (e.g., via LPP, Uu, or other uplink protocol), and/or to the second UE 504b (e.g., via D2D, PC5, or other sidelink protocol). The propagation of the timing source outage information may enable the nodes to mitigate the impact of the timing source outage on synchronization critical processes such as mobility, interference coordination, and some positioning methods (e.g., TDoA).

Figure 8:
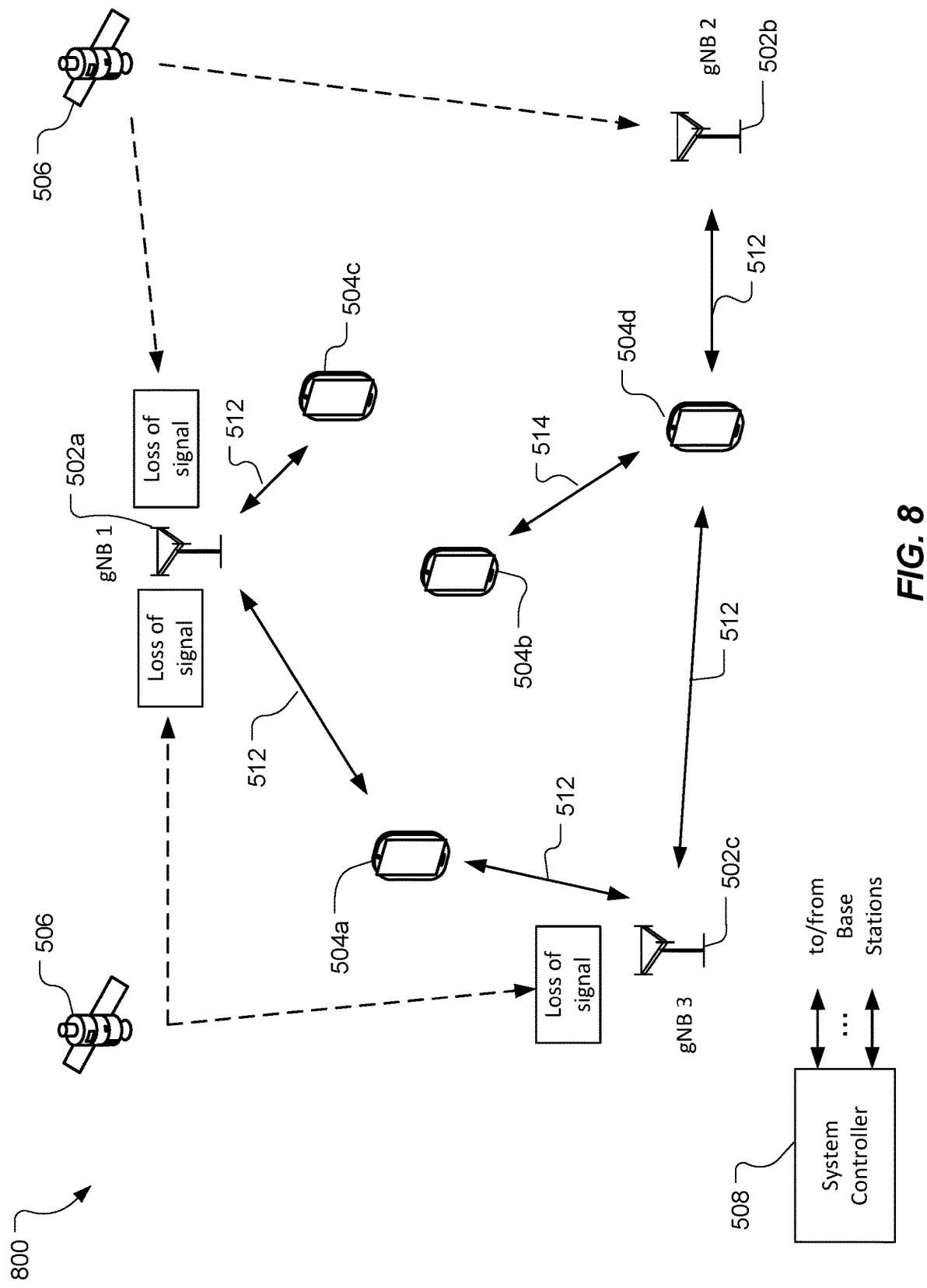
FIG. 8 is a diagram of an example network experiencing a timing source outage on a plurality of nodes.

Referring to FIG. 8, an example network 800 experiencing a timing source outage on a plurality of nodes is shown. The network 800 is an example and includes the nodes described in the network 500 depicted in FIG. 5. In this example, a wide area outage is impacting the timing source of the first base station 502a and the third base station 502c. As described in FIG. 7, a network node may inform one or more other nodes of the poor timing quality (e.g., due to a timing source outage). For example, the first base station 502a may notify the system controller 508, and/or other nodes (e.g., the first and third UEs 504a, 504c) of the timing source outage, and the third base station 502c may notify the system controller 508 and/or other nodes (e.g., the first and fourth UEs 504a, 504d) of the timing source outage. The timing source outage information may be relayed via multiple nodes by an end-to-end protocol that is routed via the intermediate nodes, or by distinct protocols on the different intermediate links, with the intermediate nodes doing the mapping from one protocol to the next. For example, the third base station 502c may also inform the second UE 504b via a relay with the fourth UE 504d. The first and third base stations 502a, 502c may also inform the system controller 508 (e.g., the LMF 120) of their respective timing source outages via NRPPa, and the system controller 508 may inform UEs (via LPP) with active positioning sessions that have been reporting timing measurements based on signals transmitted from the first and third base stations 502a, 502c. Rules may be enforced to prevent excessive or duplicated relaying. For example, a base station may inform both relay & remote UEs. A base station may have multiple communication modes with a remote UE, such as a direct connection to a remote UE (which is also in coverage of the base station), a 'containerized' connection via the relay (i.e., the relay does not process the messages on this connection), and a 'non-containerized' connection (i.e., the relay receives the message and then generates a new message for the remote UE that may contain the same info or a modified version of it). The rules may be configured to limit the messaging to a subset of the possible modes to avoid duplication. In an example, the rules may allow duplication in some cases, such as when there is an urgency or a need to ensure robust delivery of the message, or the severity/scope of the timing source outage level. The system controller 508 may be configured to aggregate the timing source outage information for multiple stations and combine and relay the aggregated timing source outage information to other network nodes.

Figure 9:
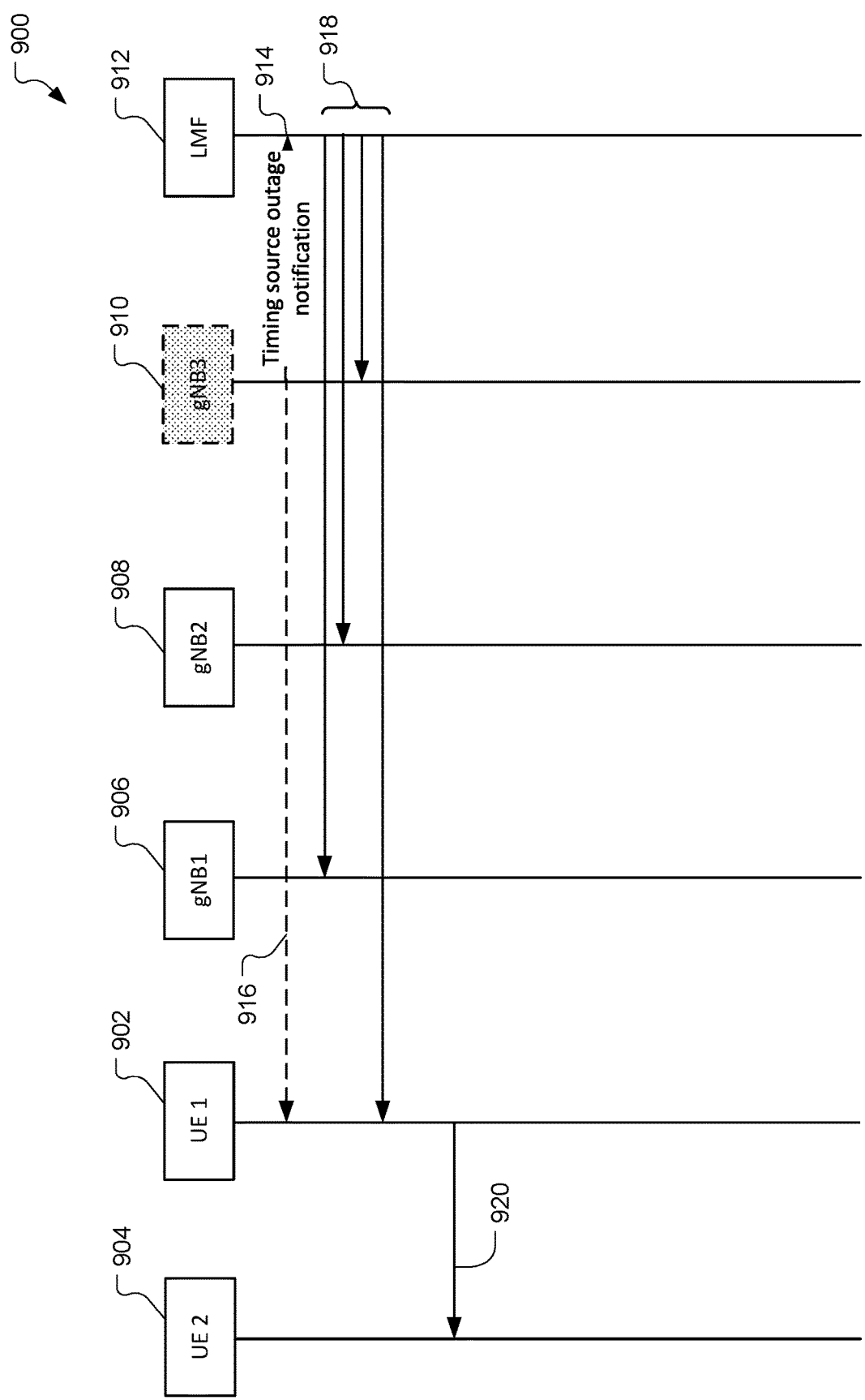
FIG. 9 is an example message flow for notifying network nodes of a timing source outage.

Referring to FIG. 9, an example message flow 900 for notifying network nodes of a timing source outage is shown. The message flow 900 may be based on the communication system 100 and includes a first UE 902, a second UE 904, a first base station 906, a second base station 908, and a third base station 910. The UEs 902, 904 and base stations 906, 908, 910 are configured to communicate with a network server such as an LMF 912. The UEs 902, 904 are examples of a UE 200, and the base stations 906, 908, 910 are examples of a TRP 300 such as the gNBs 110a-b or ng-eNB 114, the LMF 912 is an example of a network server 400 such as the LMF 120. In general, the message flow enables propagation of information and processes when a network station has incurred a timing source outage. For example, the third base station 910 may detect a timing outage based on the loss of GNSS signals. Based on the detection of the timing source outage, the third base station 910 may provide one or more timing source outage notification messages 914 to the LMF 912. In an example, the timing source outage notification messages 914 may utilize NRPPa protocols, or other network messaging protocols, and is configured to provide an indication of the timing source outage to the LMF 912. In addition to, or as an alternative to the timing source outage notification message 914, the third base station 910 may be configured to provide a timing source outage message 916 to one or more in-coverage UEs such as the first UE 902. The timing source outage message 916 may utilize OTA signaling such as RRC, MAC-CE and/or DCI.

The LMF 912 may relay one or more information elements associated with the timing source outage information included in the timing source outage notification message 914 to other network nodes. For example, the LMF 912 may send one or more timing source outage information messages 918 to the base stations 906, 908 and in-coverage UEs (e.g., the first UE 902). In an embodiment, the first UE 902 may utilize D2D sidelink to relay timing source outage information to out-of-coverage nodes, such as the second UE 904. For example, the first UE 902 may provide one or more sidelink timing outage notification messages 920 to the second UE 904. The one or more sidelink timing outage notification messages 920 may be containerized or non-containerized based on the timing outage information included in the timing source outage message 916 and/or the timing source outage information messages 918.

In operation, the network nodes may be configured to react based on receipt of the timing outage information. The reactions may vary based on the state of the node and the context associated with the timing outage. For example, in a mobility or handoff context, nodes experiencing a timing outage may be bypassed or deprioritized. In a positioning context, reference signals transmitted from an affected node may be ignored. The LMF 120 may mute one or more signals on an affected node to reduce the potential of time domain interference. Other reactions are also possible to mitigate the impact of the timing source outage. For example, industry standards may be implemented to mandate a reaction in response to receiving an indication of a timing source outage. Reactions may be permanent such that a reconfiguration may be required after the detection of the timing outage, or the reactions may be temporary and include a time limit associated with an indication of the timing source outage.

Figure 10:
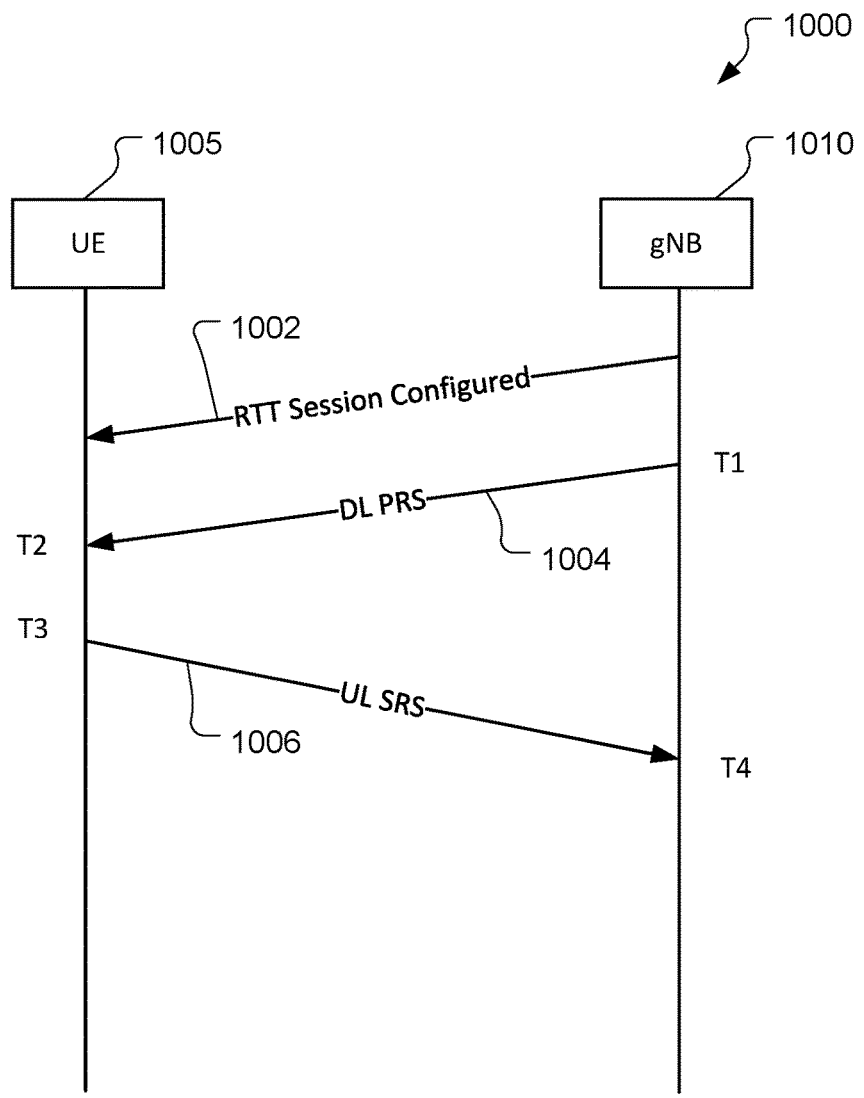
FIG. 10 is an example round trip time message flow between two network nodes.

Referring to FIG. 10, an example round trip message flow 1000 between two network nodes is shown. A first node may be a UE 1005 which is an example of the UE 200, and the second node may be a base station 1010, which is an example of a gNB 110a-b or ng-eNB 114. In general, RTT positioning methods utilize a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. The example message flow 1000 may be initiated by the base station 1010 with a RTT session configured message 1002. The base station may utilize the LPP/NRPPa messaging to configure the RTT session. At time T1, the base station 1010 may transmit a DL PRS 1004, which is received by the UE 1005 at time T2. In response, the UE 1005 may transmit a Sounding Reference Signal (SRS) for positioning message 1006 at time T3 which is received by the base station 1010 at time T4. gNB (UE) may send RxTx time difference measurement to UE(gNB) via LMF or directly. Another approach is LMF gather all two RxTx measurements from gNB & UE, calculate distance and then send to gNB(UE). The distance between the UE 1005 and the base station 1010 may be computed as:

$$\text{distance} = \frac{c}{2}((T4-T1)-(T3-T2)) \qquad (1)$$

where $c$ = speed of light.

Since the UE 1005 and base station 1010 are exchanging messages, which may include timing information, the impact of a timing offset between the stations may be minimized. That is, the RTT procedures may be used in asynchronous networks. The RTT procedure may also be used with SL PRS between two or more UEs to determine a distance, and corresponding propagation times between the UEs.

In general, the nodes in a network may be configured to react to an indication of a timing source outage. Impacted cells may be turned off, which may cause increased loads on neighboring cells or cause some UEs to go out of coverage. In an embodiment, for short term outages, the affected cell may be operated at reduced functionality. For longer term outages, however, the network may attempt to recover from the outage and provide the impacted nodes with a timing source.

In an embodiment, a UE configured with reporting for both TDOA and RTT may be used to report measurements that would allow a gNBs to synchronize. A timing source outage message may be used to trigger RTT message flows 1000 between a UE and other nodes at known locations. For example, by computing a UE position using RTT, a Receive Time Difference (RTD) may be determined based on the TDOA measurements. The RTD may represent the synchronization offset. In an example, the UE position may be known relative to the gNBs of interest and a position estimate based on the relative gNB locations may be used to reduce the overhead and latency of setting up the procedure. In an example, RTT exchanges between neighboring gNBs may also be used to determine the synchronization offset. Sidelink procedures may also be used to reestablish synchronization.

Figure 11:
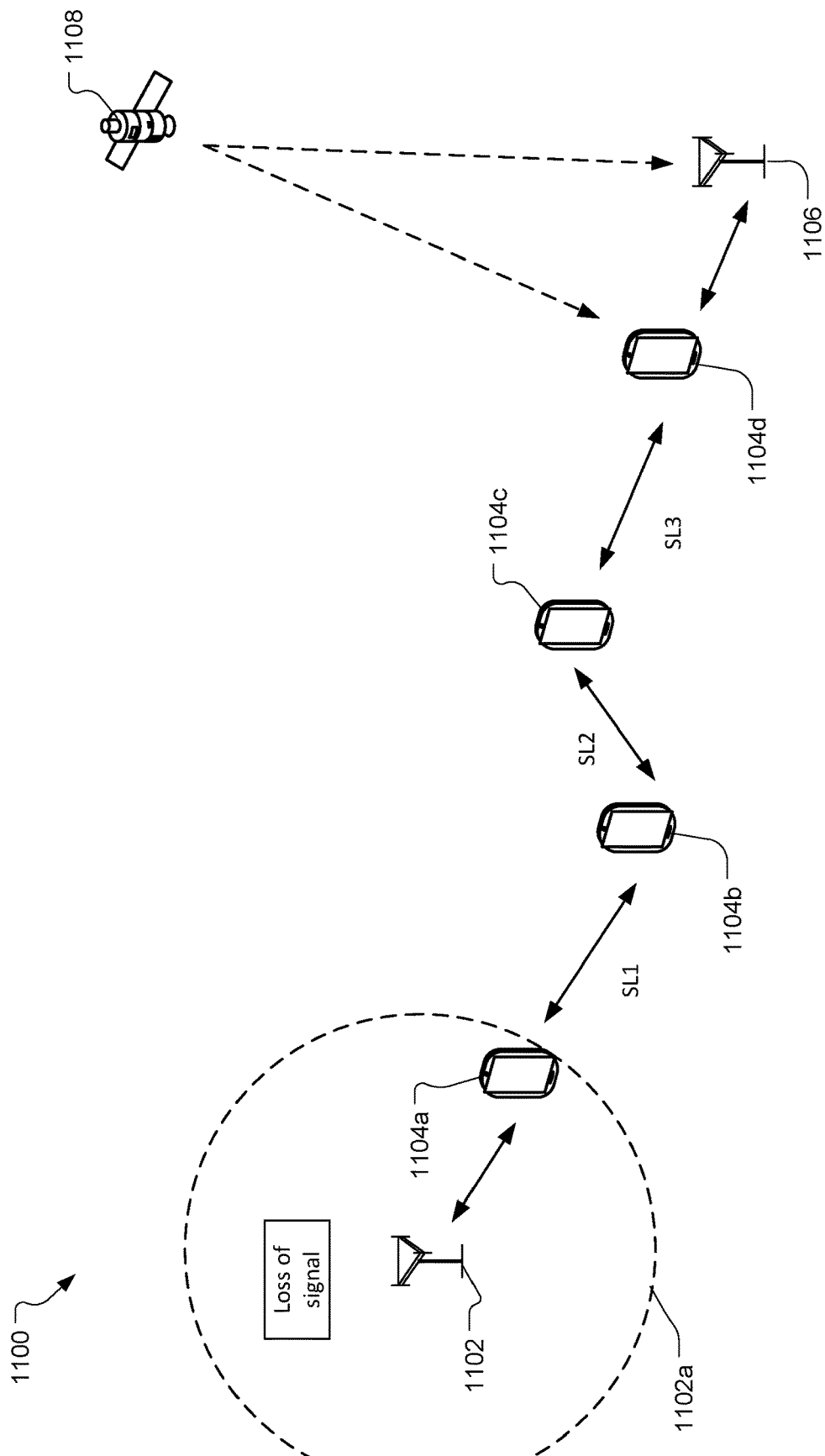
FIG. 11 is a diagram of an example sidelink based synchronization procedure.

Referring to FIG. 11, an example sidelink based synchronization procedure 1100 is shown. The procedure 1100 includes a first base station 1102 that is experiencing a timing source outage, and a second base station 1106 which is receiving timing signals from one or more satellites 1108. A plurality of UEs including a first UE 1104*a*, a second UE 1104*b*, a third UE 1104*c* and a fourth UE 1104*d* which are within sidelink communication coverage of at least a neighboring UE. The first UE 1104*a* is within a coverage area 1102*a* of the first base station 1102. In general, a sidelink synchronization procedure may enable a base station to obtain synchronization information from UEs which are synchronized with GNSS or RAN based time sources. For example, the first UE 1104*a* may provide reference synchronization information to the first base station 1102 if the first UE 1104*a* is receiving timing information from the GNSS.

The timing source outage, however, may be a large area outage such that the first base station 1102 and the first, second and third UEs 1104*a-c* are impacted by the timing source outage. In such an example, prioritization rules may be implemented to determine a synchronization source. In an example, the rules may indicate to utilize timing information from another cell which has an accurate timing source, and may prioritize cell based on the accuracy of the timing sources (e.g., stations with atomic clock based time may be more accurate than stations utilizing GNSS time information). The rules may indicate to use the synchronization reference of another cell if detected, then a synchronization reference from an in-coverage device, then a synchronization reference from an out-of-coverage device which is communicating with an in-coverage device, then an out-of-coverage device which is communicating with another out-of-coverage device which is communicating with an in-coverage device, etc. For example, the fourth UE 1104*d* is using the satellite 1108 as a timing source and may share the synchronization reference with the third UE 1104*c* via a sidelink connection (e.g., SL3). The third UE 1104*c* may then share the synchronization reference with the second UE 1104*b* via a sidelink connection (e.g., SL2). The second UE 1104*b* may then share the synchronization reference with the first UE 1104*a* via a sidelink connection (e.g., SL1), and the first UE 1104*a* may share the synchronization information with the first base station 1102 via UL connection. In an embodiment, the fourth UE 1104*d* may obtain and share a synchronization reference from another gNB, such as the second base station 1106. The nodes in the sidelink chain in the procedure 1100 are not limited to UEs. Access points and RSUs may also be used. Other channels may also be used to share the synchronization reference information. This may also be supported in IAB since the nodes (MT-DU) may already be in communication with one another. Other channels such as SSB, CSIRS, SRS, DL or UL PRS, data channels/their DMRS (P{D,U}{S,C}CH) may also be used.

In an embodiment, the propagation delays between the nodes in a sidelink synchronization procedure may be accounted for. For example, in the sidelink chain depicted in FIG. 11, where first UE 1104*a* derives timing from the second UE 1104*b*, which derives timing from the third UE 1104*c*, the first UE 1104*a* and third UE 1104*c* may not be tightly synchronized due to the propagation delay. The gNB may be configured to account for such propagation delays. In a first approach, the gNB may utilize an RTT procedure as described in FIG. 10 to determine delays. The RTT procedure may be triggered as a Uu positioning between a 'pseudo-UE' collocated with a gNB and another gNB, or may be directly negotiated between the gNBs (e.g., over Xn), possibly via intermediate gNB relays. In an IAB network, the 'pseudo-UE' may be the MT, and the 'gNB' may be the DU. In a second approach, line-of-sight (LOS) RTTs may be directly derived if the gNB positions are known. The positions may be requested by a gNB from the LMF, or the LMF may directly inform gNBs in response to receiving a timing source outage notification message. In an IAB network, Tdelta MAC-CE signaling may be defined to account for propagation delays to keep DUs time-synced. An IAB deployment may also be configured with a directed-acyclic-graph to provide a hierarchy describing which node follows timing of which other node.

Figure 12:
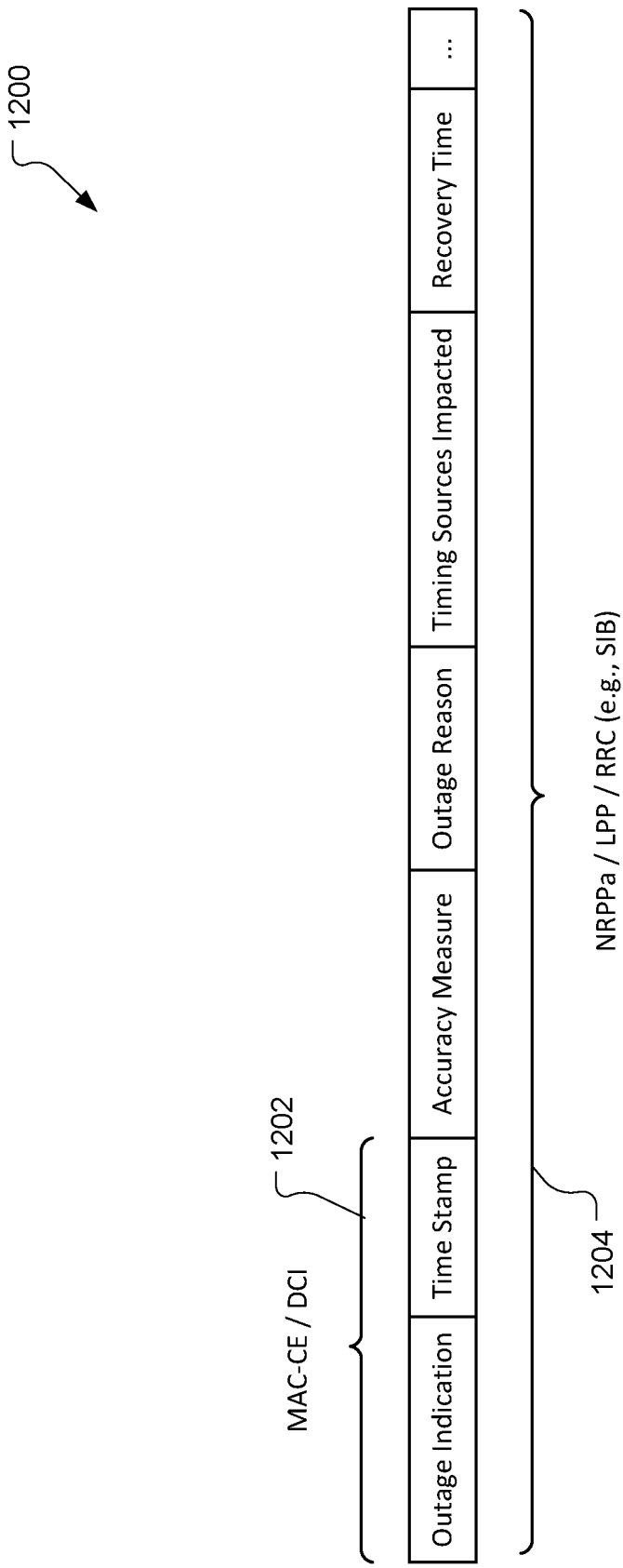
FIG. 12 is an example of information elements in timing source outage notification messages.

Referring to FIG. 12, example information elements in a timing source outage notification message 1200 are shown. In general, the timing source outage notification message 1200 contains details about the timing outage event. For example, an outage indication information element (IE) may provide an indication that a station is experiencing a timing outage. The outage indication may include station identification information or other parameters to identify a node in the network. A time stamp IE may indicate when the timing source outage occurred and/or was detected. An accuracy measure IE may indicate a synchronization and/or timing accuracy measure (e.g., indicating how much the timing is degraded). One or more outage reason IEs may indicate an estimated reason for the timing source outage. Timing sources impacted and recover time IEs may be used to indicate a scale of a timing source outage. For example, which GNSS is/are impacted, how many satellites are impacted, the expected recovery time, etc. Other IEs may also be used by a network server (e.g., the LMF) to indicate the scale of a timing source outage. For example, whether the timing source failure is limited to a gNB, or to the gNB and N of its neighbors (e.g., based on messages received from those neighbors), or to the gNB and M of its neighbors based on the reported type of timing source outage, etc. The IEs in the timing source outage notification message 1200 are examples and not limitations as other IEs may also be used to provide details about the timing source outage.

In an embodiment, one or more rules may be implemented based on the context of the nodes sending and receiving timing source outage notification messages 1200. For example, an abbreviated timing source outage notification message 1202 may be used for certain high priority protocols such as MAC-CE and DCI where data payload constraints may limit the amount of data that may be included in a timing source outage notification message. The abbreviated timing source outage notification message 1202 may include the outage indication IE and a time stamp to enable a node to react to the timing source outage. For example, a UE may be configure to react by ignoring positioning reference signals transmitted from a station based on the outage indication. Other reactions may include modifying mobility and handoff procedures to reduce the impact of the timing source outage. An expanded timing source outage notification message 1204 may include additional IEs as compared to the abbreviated timing source outage notification message 1202. For example, other protocols such as NRPPa, LPP and RRC may be capable of providing an increased number of IEs and the associated details of the timing source outage. The receive nodes may be configured to react based on the additional IEs.

Figure 13:
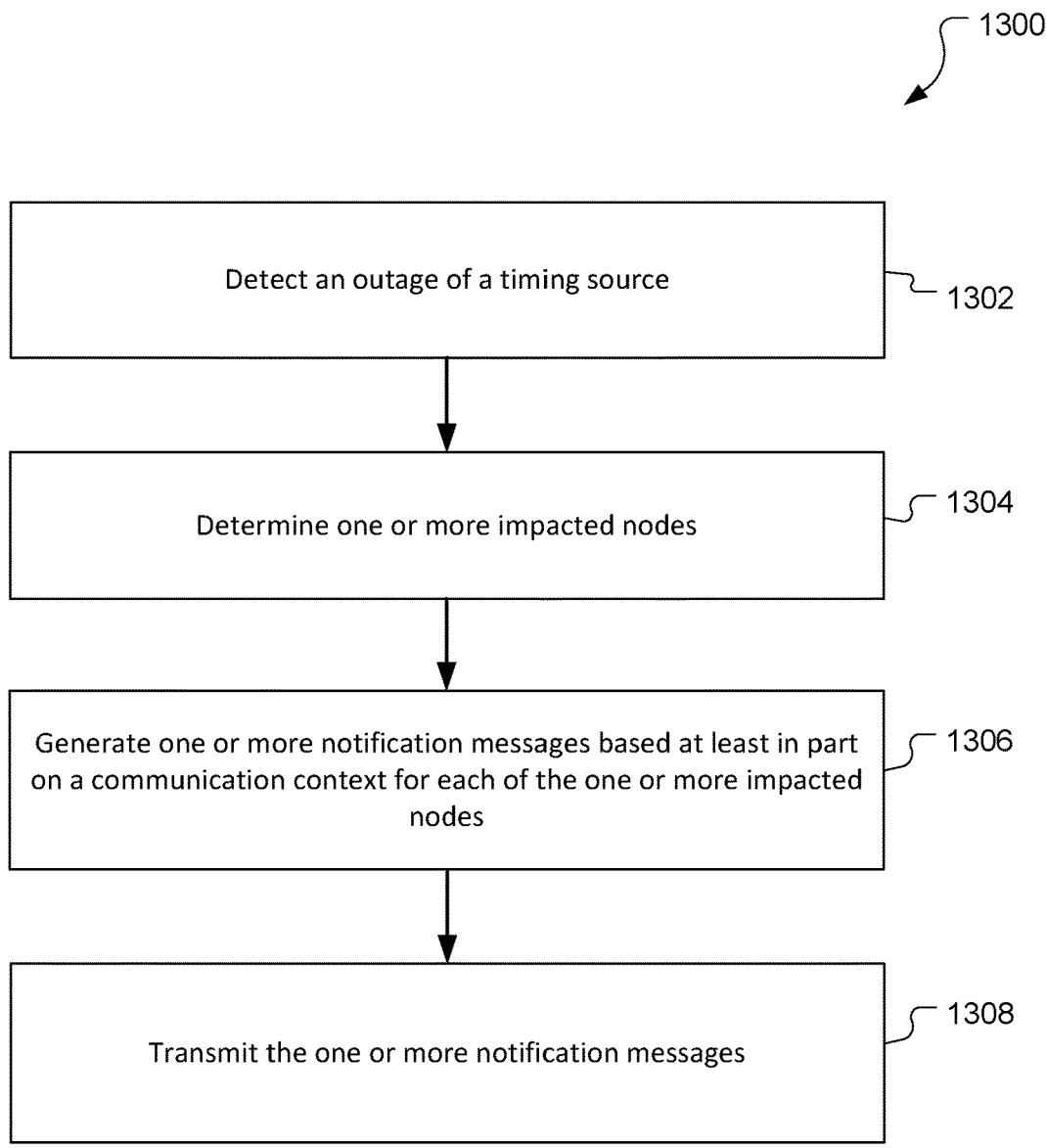
FIG. 13 is a process flow for an example method for providing a timing source outage notification to a network.

Referring to FIG. 13, with further reference to FIGS. 1-12, a method 1300 for providing a timing source outage notification to a network includes the stages shown. The method 1300 is, however, an example and not limiting. The method 1300 may be altered, e.g., by having stages added, removed, rearranged, combined, performed concurrently, and/or having single stages split into multiple stages.

At stage 1302, the method includes detecting an outage of a timing source. A TRP 300, including a processor 310, the transceiver 315 and the SPS receiver 317, is a means for detecting an outage of a timing source. In an example, referring to FIG. 9, a TRP such as the third base station 910 may be configured to detect a timing outage based on GNSS signal decode failures. Such failures may be caused by transmission issues associated with one or more satellites, or SPS receiver issues in the TRP. In an embodiment, other network nodes such as UEs, may be configured to detect a timing outage based on positioning reference signals transmitted from an impacted node (e.g., synchronization signals in excess of 10 μsecs), and provide a notification of the timing issues to the impacted TRP and/or other network nodes.

At stage 1304, the method includes determining one or more impacted nodes. The TRP 300, including the processor 310 and the transceiver 315, is a means for determining one or more impacted nodes. In an example, an impacted TRP may provide a time source outage notification message 914 to a network server, such as the LMF 912 via the NRPPa protocol, and the LMF 912 may relay one or more information elements associated with the timing source outage information included in the timing source outage notification message 914 to other network nodes. For example, the LMF 912 may send one or more timing source outage information messages 918 to the base stations 906, 908 and in-coverage UEs (e.g., the first UE 902). A TRP 300, such as the third base station 910 in FIG. 9, may be configured to provide a timing source outage message 916 to impacted nodes such as in-coverage UEs (e.g., the first UE 902). The timing source outage message 916 may utilize OTA signaling such as RRC, MAC-CE and/or DCI. In general, the impacted nodes include UEs and other nodes which are using, or will be using, synchronization sensitive methods associated with an affected base station. The synchronization sensitive methods may include positioning methods (e.g., TDOA, RSTD), inter-cell interference coordination, handover and other mobility procedures.

At stage 1306, the method includes generating one or more notification messages based at least in part on a communication context for each of the one or more impacted nodes. The TRP 300, including the processor 310, is a means for generating one or more notification messages. In an embodiment, referring to FIG. 12, one or more rules may be implemented based on the context of the nodes sending and receiving a timing source outage notification messages 1200. For example, an abbreviated timing source outage notification message 1202 may be used for certain high priority protocols such as MAC-CE and DCI where data payload constraints may limit the amount of data that may be included in a timing source outage notification message. The high priority protocols may be utilized for positioning methods, handover procedures, and other mobility procedures which may have some dependence on a synchronized time across the stations. The abbreviated timing source outage notification message 1202 may include the outage indication IE and a time stamp to enable a node to react to the timing source outage. Other IEs may also be included in the abbreviated timing source outage notification message 1202 based on the communication context. The expanded timing source outage notification message 1204 may include additional IEs as compared to the abbreviated timing source outage notification message 1202. For example, other protocols such as NRPPa, LPP and RRC may be capable of providing an increased number of IEs and the associated details of the timing source outage.

At stage 1308, the method includes transmitting the one or more notification messages. The TRP 300, including the processor 310 and the transceiver 315, is a means for transmitting the one or more notification message. The TRP 300 may be configured to utilize DL and SL protocols to transmit the one or more notification messages. For example, DL messages to a UE may be provided via RRC, MAC-CE, DCI, and LPP. In an example, the one or more notification messages may utilize SL channels such as the PSSCH, PSCCH, PSBCH, SL-SCH, etc. which may also be used by some base stations (e.g., RSUs) to transmit timing source outage notification messages. Other protocols may also be used to transmit the one or more notification messages.

Figure 14:
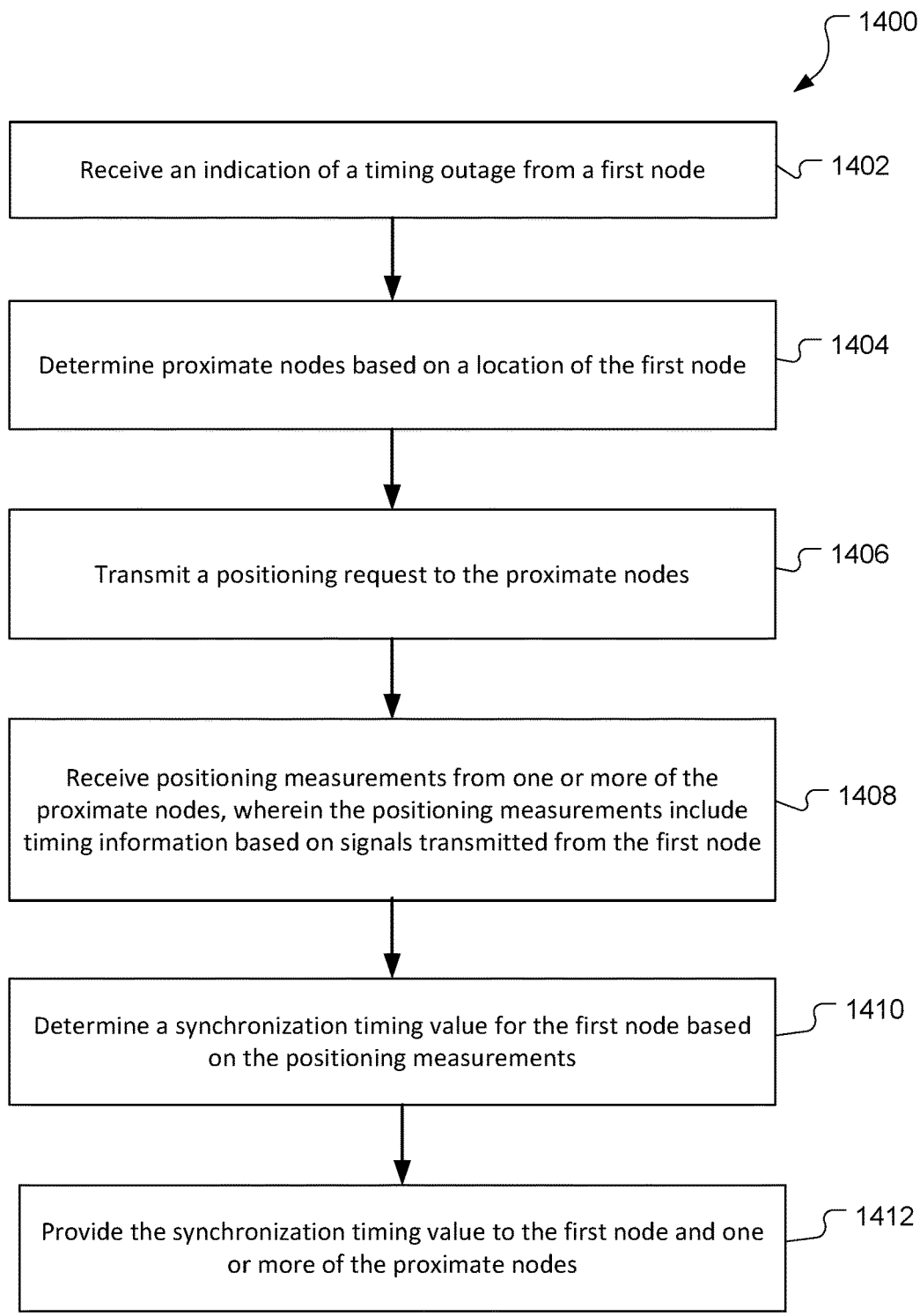
FIG. 14 is a process flow for an example method for utilizing positioning measurements to reestablish timing synchronization in a network.

Referring to FIG. 14, with further reference to FIGS. 1-12, a method 1400 for utilizing positioning measurements to reestablish timing synchronization in a network includes the stages shown. The method 1400 is, however, an example and not limiting. The method 1400 may be altered, e.g., by having stages added, removed, rearranged, combined, performed concurrently, and/or having single stages split into multiple stages.

At stage 1402, the method includes receiving an indication of a timing outage from a first node. A server 400, such as the LMF 120, including a processor 410 and a transceiver 415, is a means for receiving an indication of a timing outage from a first node. In general, receipt of an indication of a timing outage from a network node may be used to trigger the method 1400 for reestablishing timing synchronization for the impacted node. In an example, referring to FIG. 9, an affected node such as the third base station 910 may send one or more timing source outage notification messages 914 to a network entity such as a LMF. Other nodes, such as UEs impacted by synchronization errors associated with a node may provide one or more timing source outage notification messages to the LMF.

At stage 1404, the method includes determining proximate nodes based on a location of the first node. The server 400, including the processor 410, is a means for determining proximate nodes. In an example, the LMF 120 may include mobility information indicating the proximate location of UEs and stations in a wireless network. The current serving cell of a UE may provide an indication of the proximate location of the UE relative to a base station. Other network entities, such as the AMF 115 may include positioning information associated with the network nodes, and the LMF 120 may be configured to determine the proximate nodes based on one or more queries to the AMF 115. The proximate nodes may include UEs and neighboring base stations to the first node.

At stage 1406, the method includes transmitting a positioning request to the proximate nodes. The server 400, including the processor 410 and the transceiver 415, is a means for transmitting a positioning request. In an example, an LMF 120 may be configured to initiate positioning sessions with the proximate nodes. For example, a proximate UE may be configured to obtain DL PRS measurements from PRS transmitted from the first node and neighboring nodes and determine TDOA values based on the PRS. The UE may also be configured to perform RTT exchanges with the first node and the neighboring nodes. The positioning request may utilize NRPPa and LPP to the network nodes.

At stage 1408, the method includes receiving positioning measurements from one or more of the proximate nodes, wherein the positioning measurements include timing information based on signals transmitted from the first node. The server 400, including the processor 410 and the transceiver 415, is a means for receiving positioning measurements. In an example, the LMF 120 is configured to receive the TDOA and RTT measurements from UEs via LPP and from base stations vai NRPPa. The TDOA and RTT measurements will include values based on signals transmitted and received by the first node.

At stage 1410, the method includes determining a synchronization timing value for the first node based on the positioning measurements. The server 400, including the processor 410, is a means for determining the synchronization timing value. In an example, the LMF 120 may be configure to compute a position for a reporting UE based on the received RTT measurements with the base stations (including the first node). The RTT measurements are asynchronous and not impacted by the timing source outage. The LMF 120 may then compare the RTT based position with the TDOA measurements involving the first node (which depends on synchronous time stamps) to determine a Receive Time Difference (RTD) value. The RTD value represents the synchronization timing value associated with the first node.

At stage 1412, the method includes providing the synchronization timing value to the first node and to one or more or the proximate nodes. The server 400, including the processor 410 and the transceiver 415, is a means for providing the synchronization timing value. In an embodiment, the LMF 120 may provide the synchronization timing value to the proximate nodes via NRPPa and LPP messages. The synchronization timing value may also be relayed from base stations to UEs via OTA signaling such as RRC, MAC-CE and DCI. The proximate nodes may also relay the synchronization timing value via D2D sidelink protocols. In an embodiment, the first node may receive the synchronization timing value and adjust the oscillator based time (e.g., the internal system time of the first node). In an embodiment, the proximate nodes may utilize the synchronization timing value to adjust time values associated with the reference signals transmitted by the first node.

Figure 15:
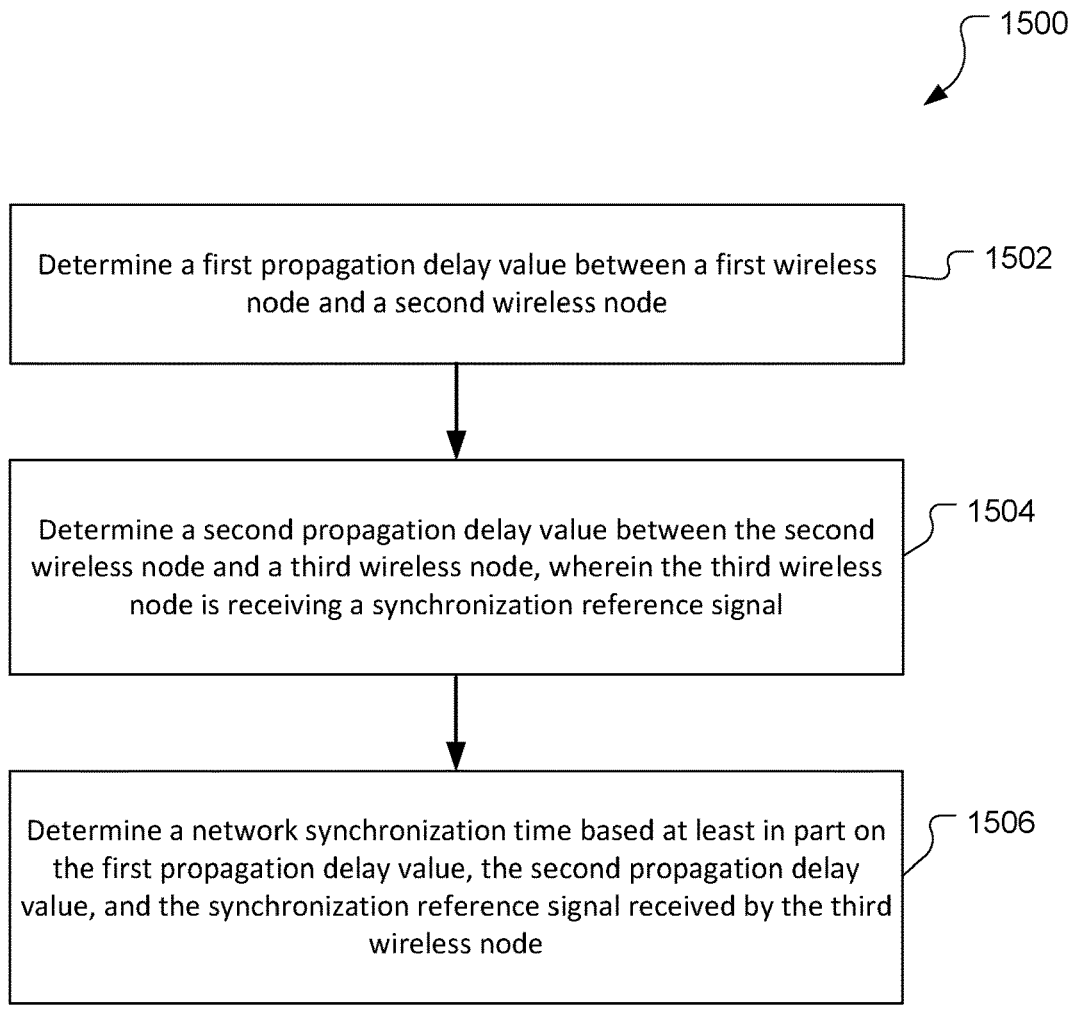
FIG. 15 is a process flow for an example method for utilizing sidelink communications to reestablish timing synchronization in a network.

Referring to FIG. 15, with further reference to FIGS. 1-12, a method 1500 for utilizing sidelink communications to reestablish timing synchronization in a network includes the stages shown. The method 1500 is, however, an example and not limiting. The method 1500 may be altered, e.g., by having stages added, removed, rearranged, combined, performed concurrently, and/or having single stages split into multiple stages.

At stage 1502, the method includes determining a first propagation delay value between a first wireless node and a second wireless node. A TRP 300, such as the first base station 1102, including a processor 310 and a transceiver 315, is a means for determining the first propagation delay value. In an example, referring to FIG. 11, the first base station 1102 may be configured to communicate with the first UE 1104a via a forward or reverse links. The first propagation delay value may be based on a distance between the first base station 1102 (i.e., the first wireless node) and the first UE 1104a (i.e., the second wireless node). The distance may be determined based on an RTT exchange (e.g., equation (1)), and the propagation delay is based on the time required for light to travel that distance.

At stage 1504, the method includes determining a second propagation delay value between the second wireless node and a third wireless node, wherein the third wireless node is receiving a synchronization reference signal. The first base station 1102, including a processor 310 and a transceiver 315, is a means for determining the second propagation delay value. In an example, the second UE 1104b may be out of coverage of the first base station 1102, but may communicate with the first UE 1104a via a D2D sidelink. The first UE 1104a (i.e., the second node) and the second UE 1104b (i.e., the third node) may perform a RTT procedure to determine a propagation delay value between their respective locations. In an example, the second UE 1104b may be in a position to obtain a GNSS time (e.g., from a satellite) or a synchronization time from another node (e.g., RAN time from a UE or base station). The second UE 1104b may provide the synchronization time to the first UE 1104a, and the first UE 1104a may relay the synchronization time to the first base station 1102.

At stage 1506, the method includes determining a network synchronization time based at least in part on the first propagation delay value, the second propagation delay value, and the synchronization reference signal received by the third wireless node. The first base station 1102, including a processor 310 and a transceiver 315, is a means for determining the network synchronization time. The first base station 1102 is configured to account for the propagation delays between the nodes. For example, the first base station 1102 may add the propagation delays, and any turnaround time delays created by the relaying nodes, to the synchronization reference signal information obtained by the third wireless node. In an embodiment, the RTT procedures in stages 1502 and 1504 may be triggered as a Uu positioning, between a 'pseudo-UE' collocated with the first base station and another base station, or may be directly negotiated between the base stations. Intermediate base station relays may also be used and the second wireless node. In an IAB network, the 'pseudo-UE' may be the MT, and the 'gNB' may be the DU. In a second approach, the first propagation delay value and the second propagation delay value may be directly derived if the gNB positions are known. The first wireless node may reestablish network synchronization based on the network synchronization time.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. For example, one or more functions, or one or more portions thereof, discussed above as occurring in the LMF 120 may be performed outside of the LMF 120 such as by the TRP 300.

Components, functional or otherwise, shown in the figures and/or discussed herein as being connected or communicating with each other are communicatively coupled unless otherwise noted. That is, they may be directly or indirectly connected to enable communication between them.

As used herein, unless otherwise stated, a statement that a function or operation is "based on" an item or condition means that the function or operation is based on the stated item or condition and may be based on one or more items and/or conditions in addition to the stated item or condition.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure). Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements without departing from the scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

1. A method for providing a timing source outage notification, comprising:

detecting an outage of a timing source;
determining one or more impacted nodes;
generating one or more notification messages based at least in part on a communication context for each of the one or more impacted nodes; and
transmitting the one or more notification messages.

2. The method of clause 1 wherein the outage of the timing source is associated with a base station.

3. The method of clause 2 wherein detecting the outage in the timing source includes receiving a timing source outage notification message from the base station based on a New Radio Positioning Protocol.

4. The method of clause 1 wherein detecting the outage of the timing source is based on a failure to decode a global navigation satellite system signal.

5. The method of clause 1 wherein the detecting the outage of the timing source is based on a reference signal measurement obtained by a user equipment.

6. The method of clause 1 wherein the one or more notification messages include an indication of a node experiencing the outage of the timing source and a timestamp indicating a time the outage of the timing source occurred.

7. The method of clause 1 wherein the one or more notification messages include at least one of an accuracy measure information element, an outage reason information element, a timing sources impacted information element, and a recovery time information element.

8. The method of clause 1 wherein the communication context for a first impacted node includes a positioning procedure, and transmitting the one or more notification messages includes transmitting a first notification message to the first impacted node via a medium access control control element or a downlink control element.

9. The method of clause 1 wherein transmitting the one or more notification messages includes transmitting at least one notification message to a user equipment.

10. A method for reestablishing timing synchronization, comprising:
determining a first propagation delay value between a first wireless node and a second wireless node;
determining a second propagation delay value between the second wireless node and a third wireless node, wherein the third wireless node is receiving a synchronization reference signal; and
determining a network synchronization time based at least in part on the first propagation delay value, the second propagation delay value, and the synchronization reference signal received by the third wireless node.

11. The method of clause 10 wherein the first wireless node is a first base station and the second wireless node is a first user equipment.

12. The method of clause 11 further comprising obtaining round trip time measurements based on signals exchanged between the first base station and the first user equipment, wherein the first propagation delay value is based on a distance computed using the round trip time measurements.

13. The method of clause 11 wherein the third wireless node is a second base station.

14. The method of clause 13 further comprising obtaining round trip time measurements based on signals exchanged between the second base station and the first user equipment, wherein the second propagation delay value is based on a distance computed using the round trip time measurements.

15. The method of clause 11 wherein the third wireless node is a second user equipment.

16. The method of clause 15 further comprising obtaining round trip time measurements based on sidelink signals exchanged between the first user equipment and the second user equipment, wherein the second propagation delay value is based on a distance computed using the round trip time measurements.

17. The method of clause 10 wherein the synchronization reference signal is based at least in part on a global navigation satellite system signal.

18. The method of clause 10 wherein the first wireless node is a first user equipment and the second wireless node is a second user equipment.

19. The method of clause 18 further comprising obtaining round trip time measurements based on sidelink signals exchanged between the first user equipment and the second user equipment, wherein the first propagation delay value is based on a distance computed using the round trip time measurements.

20. An apparatus, comprising:
a memory;
at least one transceiver;
at least one processor communicatively coupled to the memory and the at least one transceiver, and configured to:
detect an outage of a timing source;
determine one or more impacted nodes;
generate one or more notification messages based at least in part on a communication context for each of the one or more impacted nodes; and
transmit the one or more notification messages.

21. The apparatus of clause 20 wherein the outage of the timing source is associated with a base station.

22. The apparatus of clause 21 wherein the at least one processor is further configured to receive a timing source outage notification message from the base station based on a New Radio Positioning Protocol.

23. The apparatus of clause 20 wherein the at least one processor is further configured to detect a failure to decode a global navigation satellite system signal.

24. The apparatus of clause 20 wherein the at least one processor is further configured detect the outage of the timing source based on a reference signal measurement obtained by a user equipment.

25. The apparatus of clause 20 wherein the one or more notification messages include an indication of a node experiencing the outage of the timing source and a timestamp indicating a time the outage of the timing source occurred.

26. The apparatus of clause 20 wherein the one or more notification messages include at least one of an accuracy measure information element, an outage reason information element, a timing sources impacted information element, and a recovery time information element.

27. The apparatus of clause 20 wherein the communication context for a first impacted node includes a positioning procedure, and the at least one processor is further configured to transmit a first notification message to the first impacted node via a medium access control control element or a downlink control element.

28. The apparatus of clause 20 wherein the at least one processor is further configured to transmit at least one notification message to a user equipment.

29. An apparatus, comprising:
a memory;
at least one transceiver;
at least one processor communicatively coupled to the memory and the at least one transceiver, and configured to:
determine a first propagation delay value between a first wireless node and a second wireless node;

determine a second propagation delay value between the second wireless node and a third wireless node, wherein the third wireless node is receiving a synchronization reference signal; and determine a network synchronization time based at least in part on the first propagation delay value, the second propagation delay value, and the synchronization reference signal received by the third wireless node.

30. The apparatus of clause 29 wherein the first wireless node is a first base station and the second wireless node is a first user equipment.

31. The apparatus of clause 30 wherein the at least one processor is further configured to obtain round trip time measurements based on signals exchanged between the first base station and the first user equipment, wherein the first propagation delay value is based on a distance computed using the round trip time measurements.

32. The apparatus of clause 30 wherein the third wireless node is a second base station.

33. The apparatus of clause 32 wherein the at least one processor is further configured to obtain round trip time measurements based on signals exchanged between the second base station and the first user equipment, wherein the second propagation delay value is based on a distance computed using the round trip time measurements.

34. The apparatus of clause 30 wherein the third wireless node is a second user equipment.

35. The apparatus of clause 34 wherein the at least one processor is further configured to obtain round trip time measurements based on sidelink signals exchanged between the first user equipment and the second user equipment, wherein the second propagation delay value is based on a distance computed using the round trip time measurements.

36. The apparatus of clause 29 wherein the synchronization reference signal is based at least in part on a global navigation satellite system signal.

37. The apparatus of clause 29 wherein the first wireless node is a first user equipment and the second wireless node is a second user equipment.

38. The apparatus of clause 37 wherein the at least one processor is further configured to obtain round trip time measurements based on sidelink signals exchanged between the first user equipment and the second user equipment, wherein the first propagation delay value is based on a distance computed using the round trip time measurements.

39. An apparatus for providing a timing source outage notification, comprising:
  means for detecting an outage of a timing source;
  means for determining one or more impacted nodes;
  means for generating one or more notification messages based at least in part on a communication context for each of the one or more impacted nodes; and
  means for transmitting the one or more notification messages.

40. An apparatus for reestablishing timing synchronization, comprising:
  means for determining a first propagation delay value between a first wireless node and a second wireless node;
  means for determining a second propagation delay value between the second wireless node and a third wireless node, wherein the third wireless node is receiving a synchronization reference signal; and
  means for determining a network synchronization time based at least in part on the first propagation delay value, the second propagation delay value, and the synchronization reference signal received by the third wireless node.

41. A non-transitory processor-readable storage medium comprising processor-readable instructions configured to cause one or more processors to provide a timing source outage notification, comprising:
  code for detecting an outage of a timing source;
  code for determining one or more impacted nodes;
  code for generating one or more notification messages based at least in part on a communication context for each of the one or more impacted nodes; and
  code for transmitting the one or more notification messages.

42. A non-transitory processor-readable storage medium comprising processor-readable instructions configured to cause one or more processors to reestablish timing synchronization, comprising:
  code for determining a first propagation delay value between a first wireless node and a second wireless node;
  code for determining a second propagation delay value between the second wireless node and a third wireless node, wherein the third wireless node is receiving a synchronization reference signal; and
  code for determining a network synchronization time based at least in part on the first propagation delay value, the second propagation delay value, and the synchronization reference signal received by the third wireless node.

The invention claimed is:

1. A method for providing a timing source outage notification, comprising:
  detecting an outage of a timing source;
  determining one or more impacted nodes;
  determining a communication context for the one or more impacted nodes based at least in part on whether the one or more impacted nodes is participating in a synchronous sensitive procedure;
  selecting a protocol based at least in part on the communication context;
  generating one or more notification messages based at least in part on the selected protocol and the communication context for the one or more impacted nodes; and
  transmitting the one or more notification messages.

2. The method of claim 1 wherein the outage of the timing source is associated with a base station.

3. The method of claim 2 wherein detecting the outage in the timing source includes receiving a timing source outage notification message from the base station based on a New Radio Positioning Protocol.

4. The method of claim 1 wherein detecting the outage of the timing source is based on a failure to decode a global navigation satellite system signal.

5. The method of claim 1 wherein the detecting the outage of the timing source is based on a reference signal measurement obtained by a user equipment.

6. The method of claim 1 wherein the one or more notification messages include an indication of a node experiencing the outage of the timing source and a timestamp indicating a time the outage of the timing source occurred.

7. The method of claim 1 wherein the one or more notification messages include at least one of an accuracy measure information element, an outage reason information element, a timing sources impacted information element, and a recovery time information element.

8. The method of claim 1 wherein the communication context for a first impacted node includes a positioning procedure, and transmitting the one or more notification messages includes transmitting a first notification message to the first impacted node via a medium access control element or a downlink control element.

9. The method of claim 1 wherein transmitting the one or more notification messages includes transmitting at least one notification message to a user equipment.

10. An apparatus, comprising:
a memory;
at least one transceiver;
at least one processor communicatively coupled to the memory and the at least one transceiver, and configured to:
  detect an outage of a timing source;
  determine one or more impacted nodes;
  determine a communication context for the one or more impacted nodes based at least in part on whether the one or more impacted nodes is participating in a synchronous sensitive procedure;
  select a protocol based at least in part on the communication context;
  generate one or more notification messages based at least in part on the selected protocol and the communication context for the one or more impacted nodes; and
  transmit the one or more notification messages.

11. The apparatus of claim 10 wherein the at least one processor is further configured to detect a failure to decode a global navigation satellite system signal.

12. The apparatus of claim 10 wherein the at least one processor is further configured detect the outage of the timing source based on a reference signal measurement obtained by a user equipment.

13. The apparatus of claim 10 wherein the one or more notification messages include at least one of an indication of a node experiencing the outage of the timing source, a timestamp indicating a time the outage of the timing source occurred, an accuracy measure information element, an outage reason information element, a timing sources impacted information element, and a recovery time information element.

14. The apparatus of claim 10 wherein the communication context for a first impacted node includes a positioning procedure, and the at least one processor is further configured to transmit a first notification message to the first impacted node via a medium access control element or a downlink control element.

15. The apparatus of claim 10 wherein the at least one processor is further configured to transmit at least one notification message to a user equipment.

* * * * *